United States Patent
Oser

(10) Patent No.: US 11,270,116 B2
(45) Date of Patent: Mar. 8, 2022

(54) METHOD, DEVICE, AND SYSTEM FOR GENERATING AFFORDANCES LINKED TO A REPRESENTATION OF AN ITEM

(71) Applicant: Apple Inc., Cupertino, CA (US)

(72) Inventor: Alexander Oser, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/702,306

(22) Filed: Dec. 3, 2019

(65) Prior Publication Data

US 2020/0175275 A1 Jun. 4, 2020

Related U.S. Application Data

(60) Provisional application No. 62/775,017, filed on Dec. 4, 2018.

(51) Int. Cl.
  *G06K 9/00* (2006.01)
  *G06F 3/01* (2006.01)

(52) U.S. Cl.
  CPC .......... *G06K 9/00671* (2013.01); *G06F 3/011* (2013.01); *G06F 3/013* (2013.01); *G06F 3/017* (2013.01); *G06K 9/00765* (2013.01)

(58) Field of Classification Search
  None
  See application file for complete search history.

(56) References Cited

U.S. PATENT DOCUMENTS

| | | | | |
|---|---|---|---|---|
| 9,405,432 B2* | 8/2016 | Vats | ............... | G06F 3/04845 |
| 9,886,430 B2* | 2/2018 | Patten | ............... | G06F 16/957 |
| 2011/0115816 A1* | 5/2011 | Brackney | ............... | H05B 47/10 |
| | | | | 345/629 |
| 2013/0042296 A1* | 2/2013 | Hastings | ............... | G06F 21/10 |
| | | | | 726/1 |
| 2015/0331576 A1* | 11/2015 | Piya | ............... | G06F 3/04815 |
| | | | | 715/850 |
| 2019/0050137 A1* | 2/2019 | Mildrew | ............... | G06F 3/013 |

* cited by examiner

*Primary Examiner* — Edward Martello
(74) *Attorney, Agent, or Firm* — Fernando & Partners, LLP

(57) ABSTRACT

In one implementation, a method of generating an affordance linked to an SR representation of an item is performed in a device including one or more processors, a non-transitory memory, and one or more displays. The method includes identifying an item; generating an affordance-item pair that corresponds to the item; detecting an input selecting the affordance-item pair; and displaying, on the one or more displays, a simulated reality (SR) environment that includes an SR representation of the item in response to detecting the user input selecting the affordance-item pair. In some implementations, the method includes obtaining an image data frame that includes the item.

26 Claims, 19 Drawing Sheets

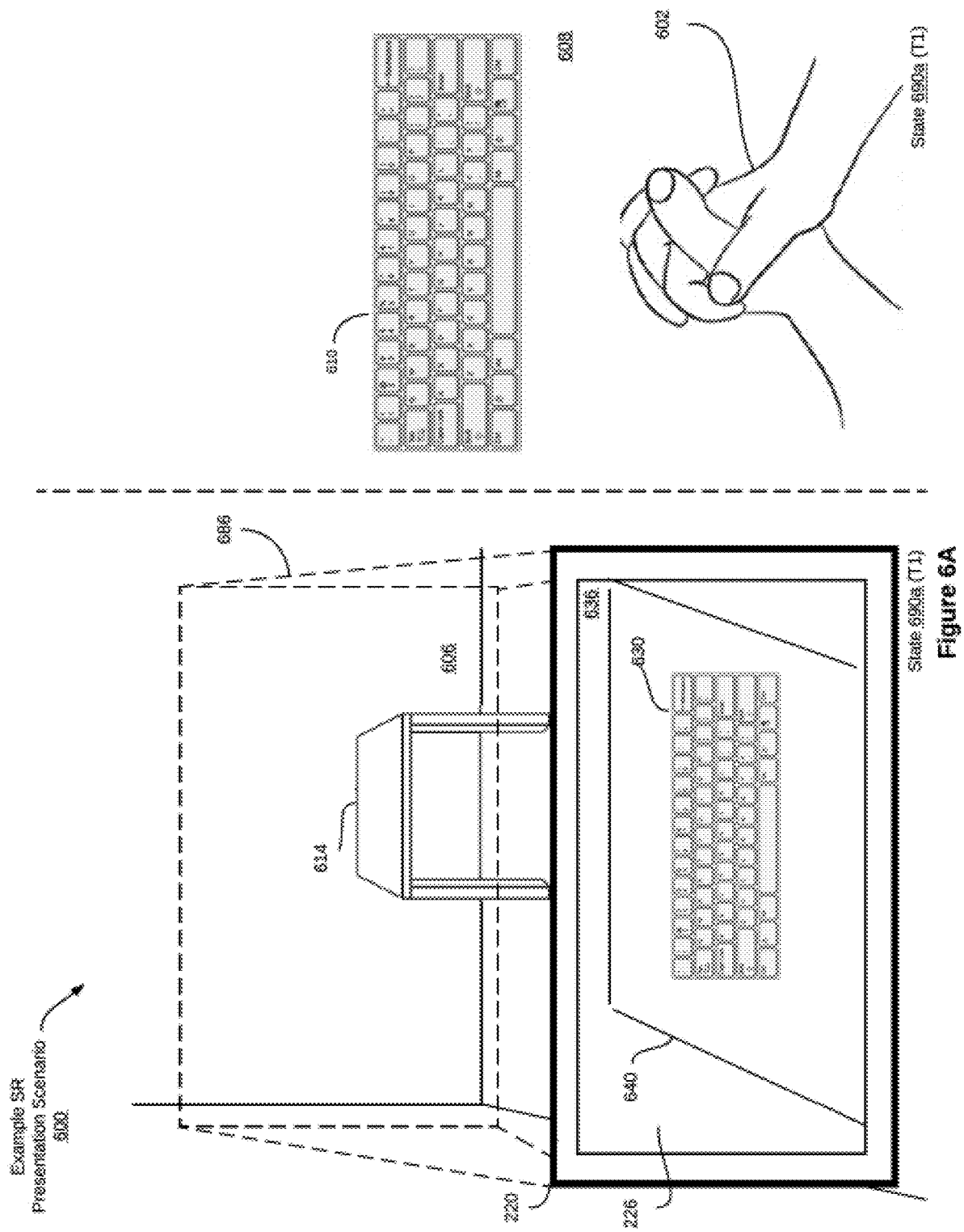

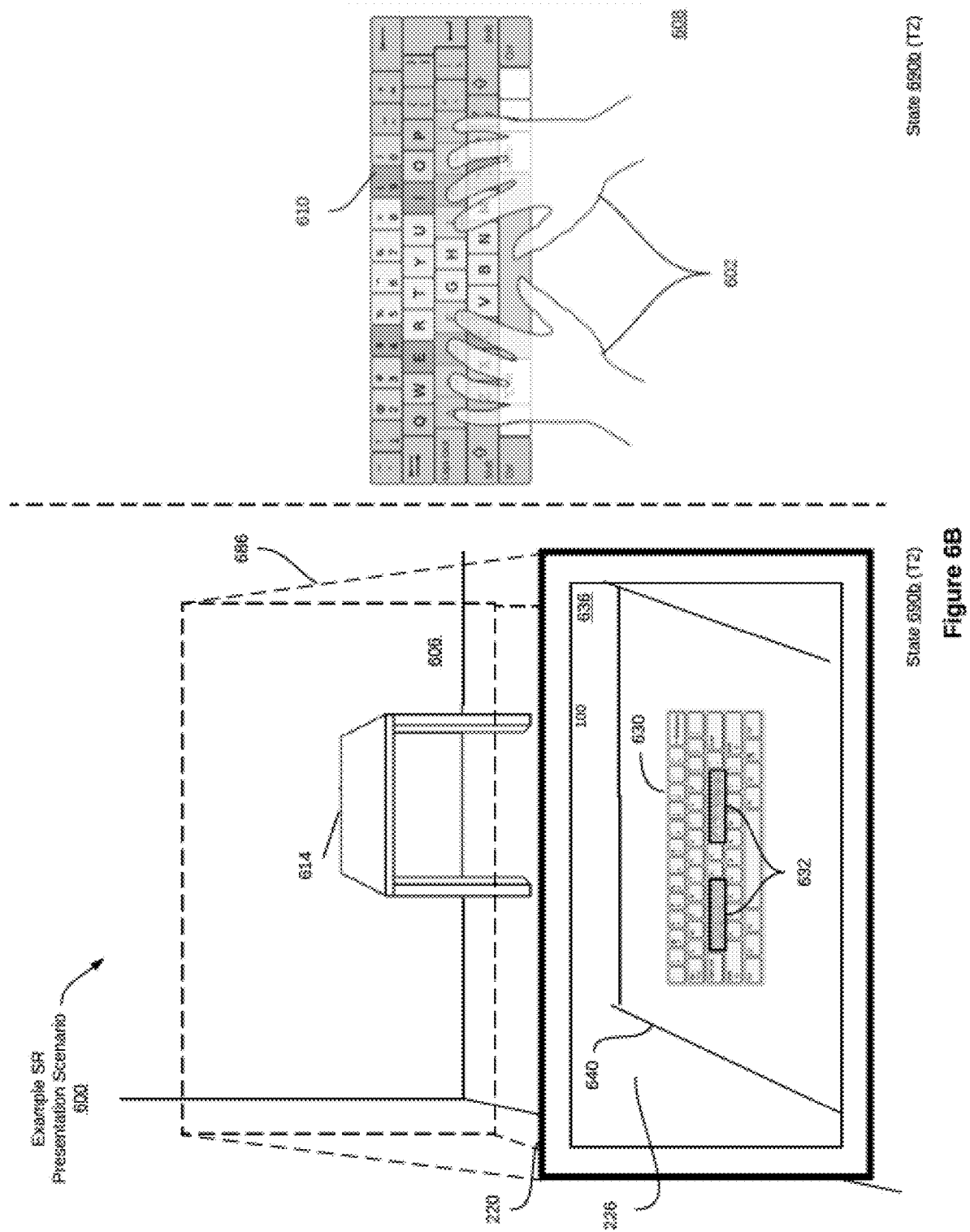

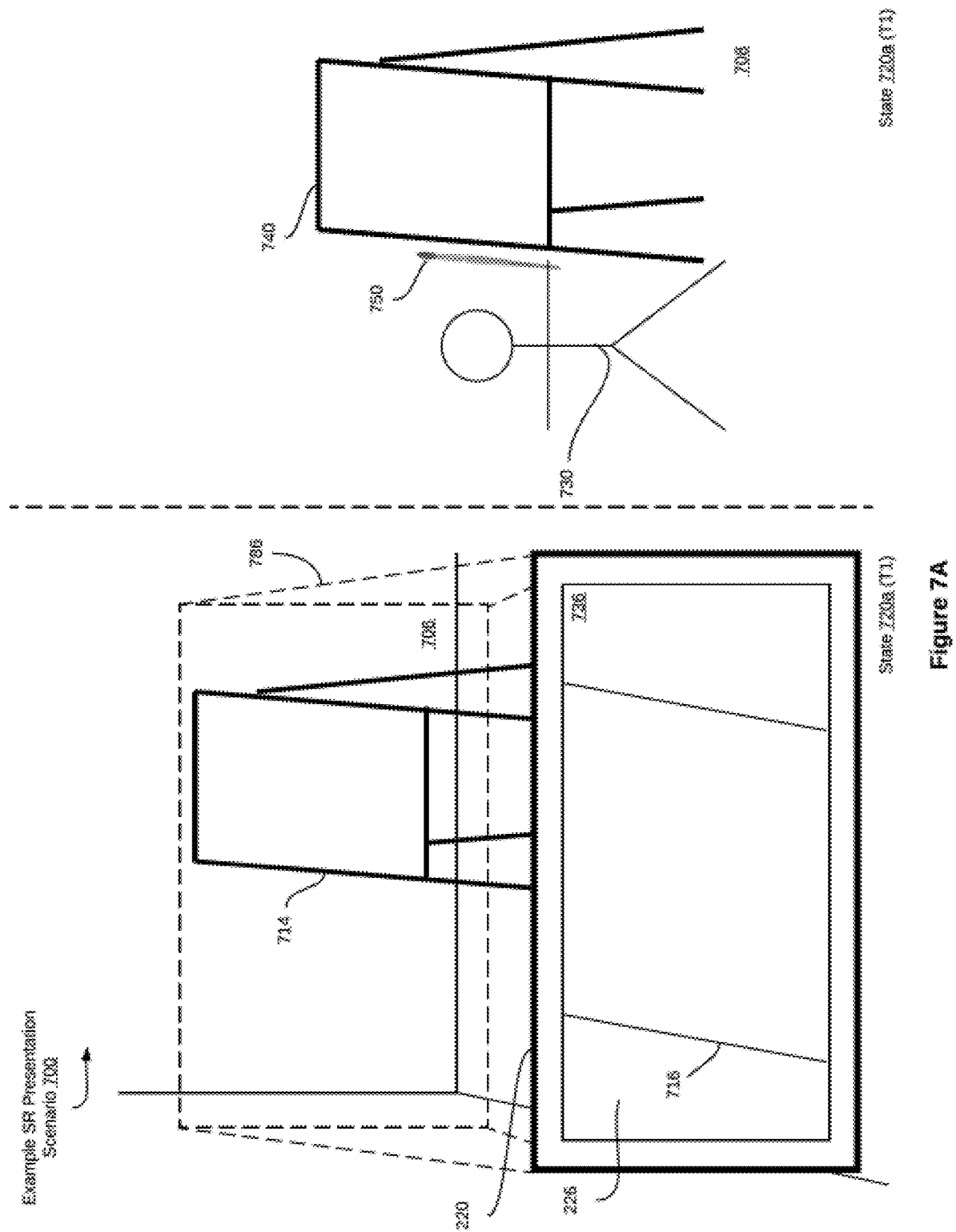

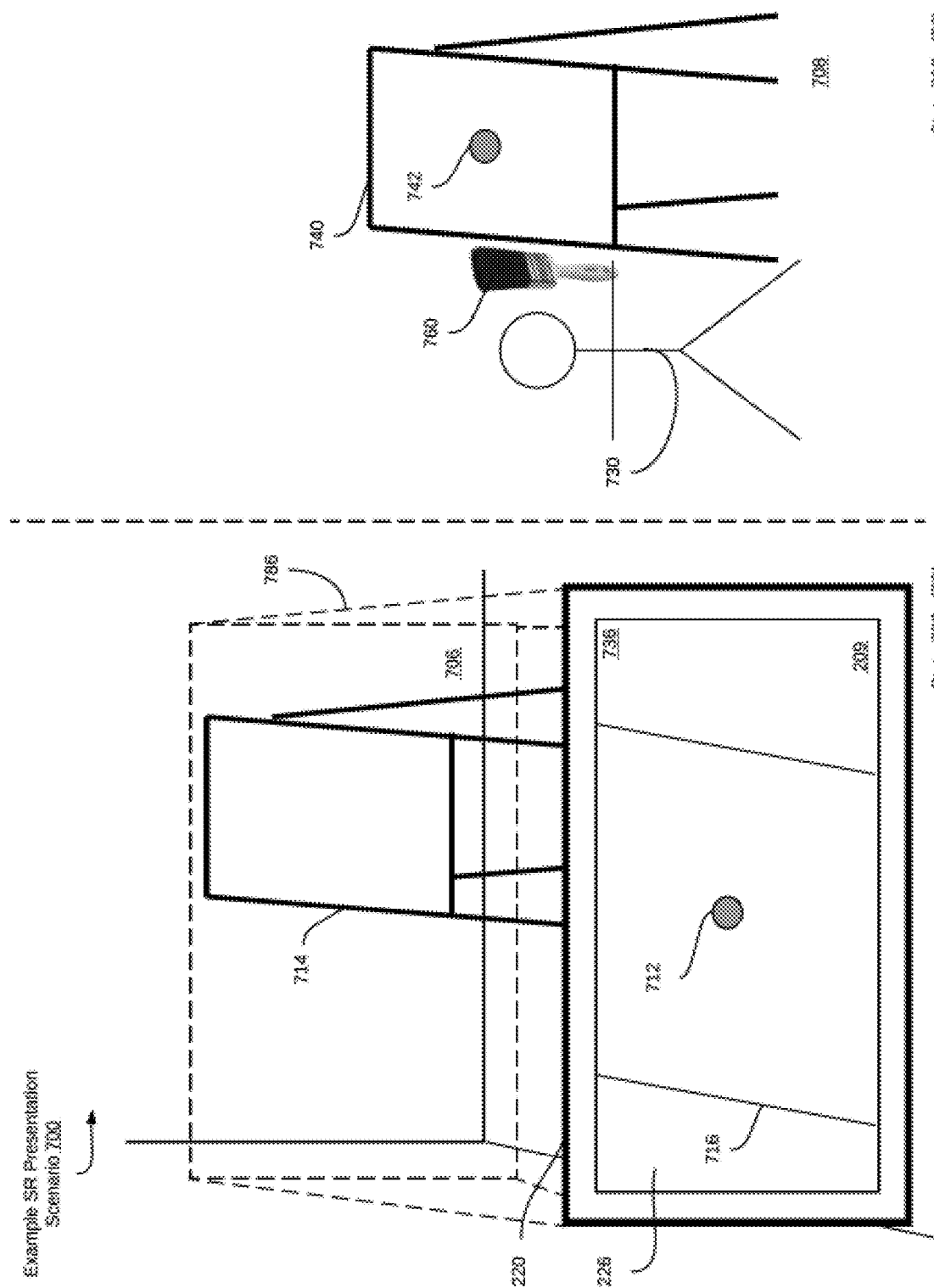

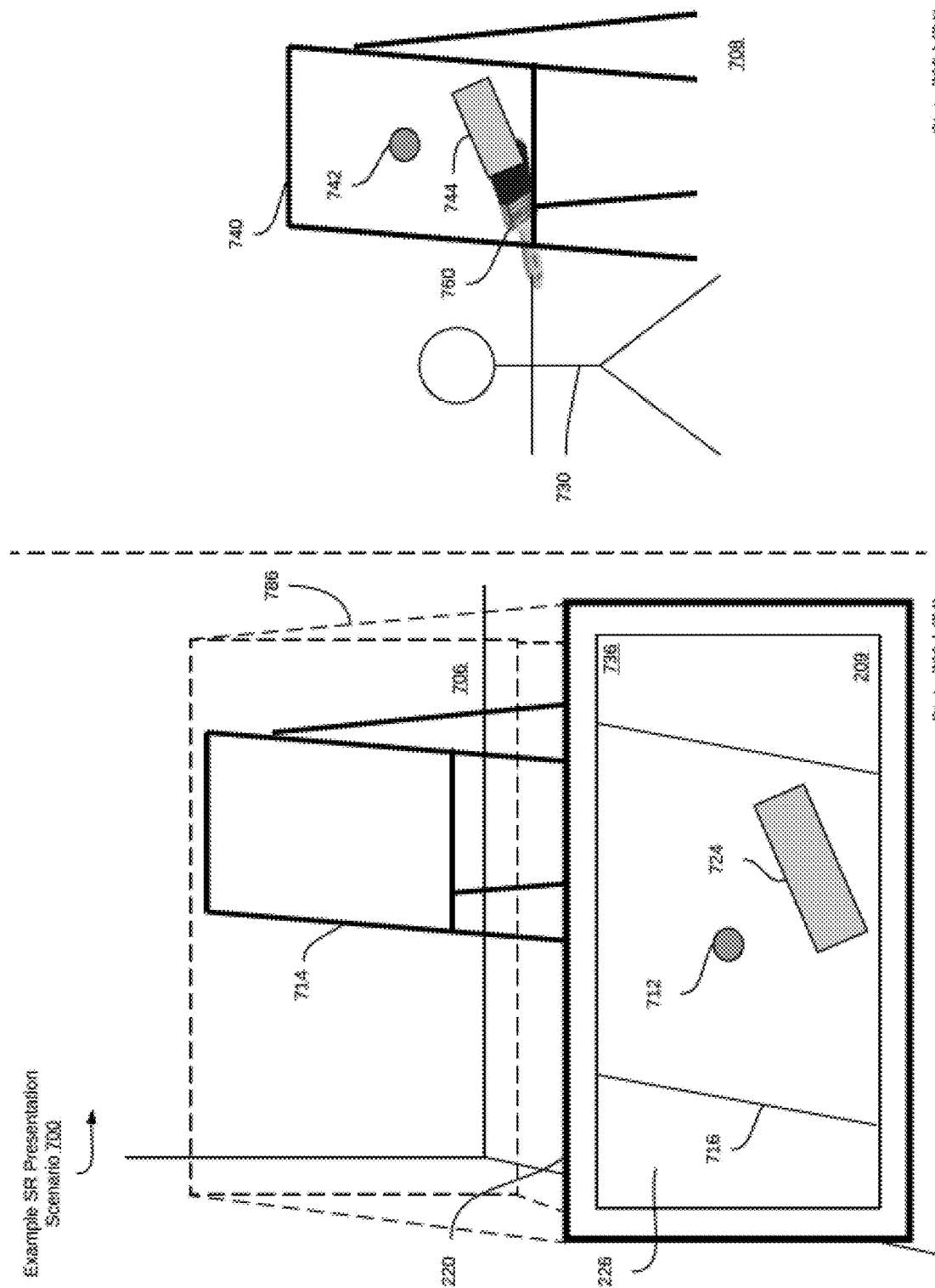

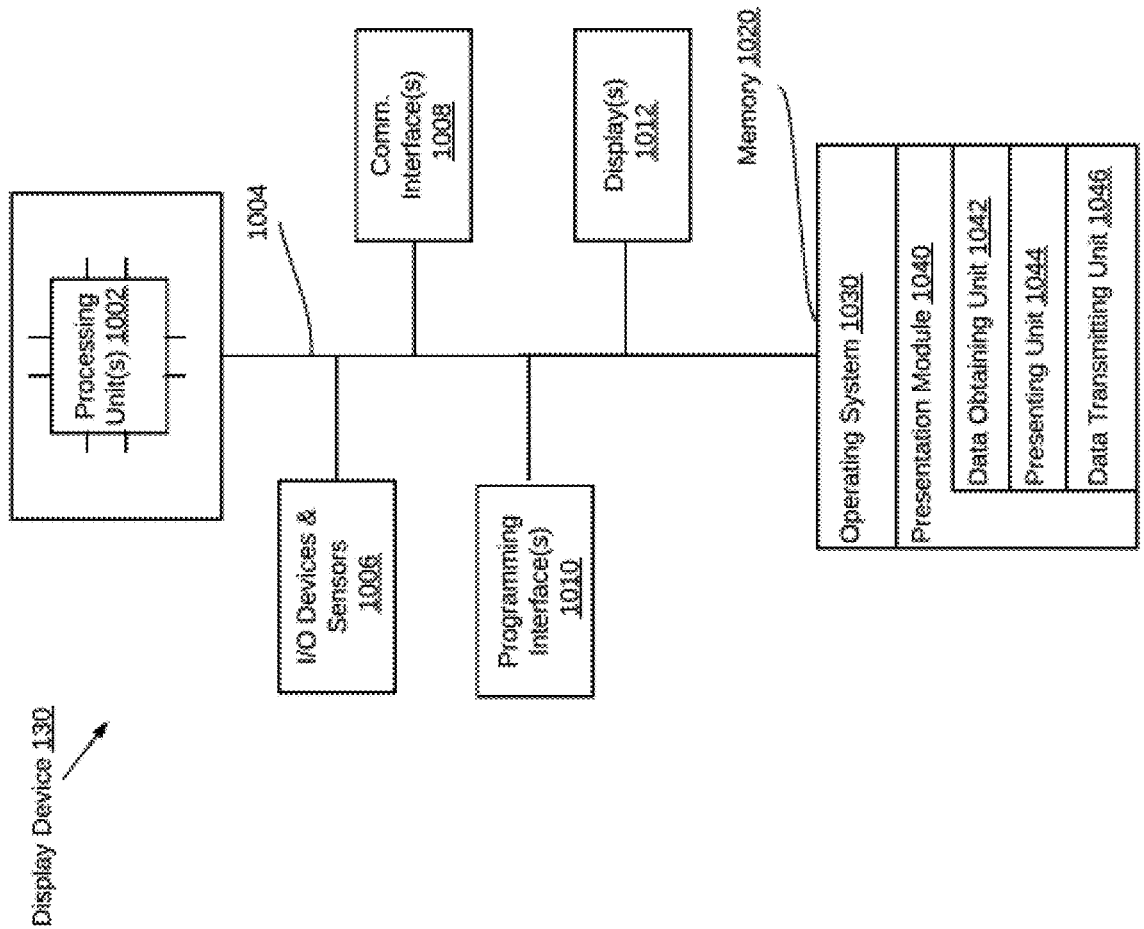

METHOD, DEVICE, AND SYSTEM FOR GENERATING AFFORDANCES LINKED TO A REPRESENTATION OF AN ITEM

CROSS-REFERENCE TO RELATED APPLICATIONS

This application claims the benefit of U.S. Provisional Patent App. Nos. 62/775,017, filed on Dec. 4, 2018, which is incorporated by reference in its entirety.

TECHNICAL FIELD

The present disclosure generally relates to simulated reality (SR), and in particular, to systems, methods, and devices for generating an affordance linked to an SR representation of an item in SR environments.

BACKGROUND

When a user watches a video stream that includes items, the user is unable to glean further information or perspectives of those items without using an auxiliary device. For example, when a user is watching a basketball game on a television, the user may see a basketball player wearing a particular shoe that the user is interested in. In this example, the user would use a separate device to access more information about the particular shoe that the user sees on the television.

Additionally, when a user watches a tutorial (e.g., a live video feed or a pre-recorded video feed), the user may not be able to see how to perform a technique on an item in the tutorial due to obstructions in the tutorial or the angles presented in the tutorial. Instead, the user would infer from the tutorial how to perform the technique in the tutorial on a real-world item of the user.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 6A and 6B illustrate a process for displaying an indication of a real-world interaction with a second item as an overlay on a first item in accordance with some implementations.

FIGS. 7A-7D illustrate another process for displaying an indication of a real-world interaction with a second item as an overlay on a first item in accordance with some implementations.

FIG. 10 is a block diagram of an example display device in accordance with some implementations.

Figure 1:
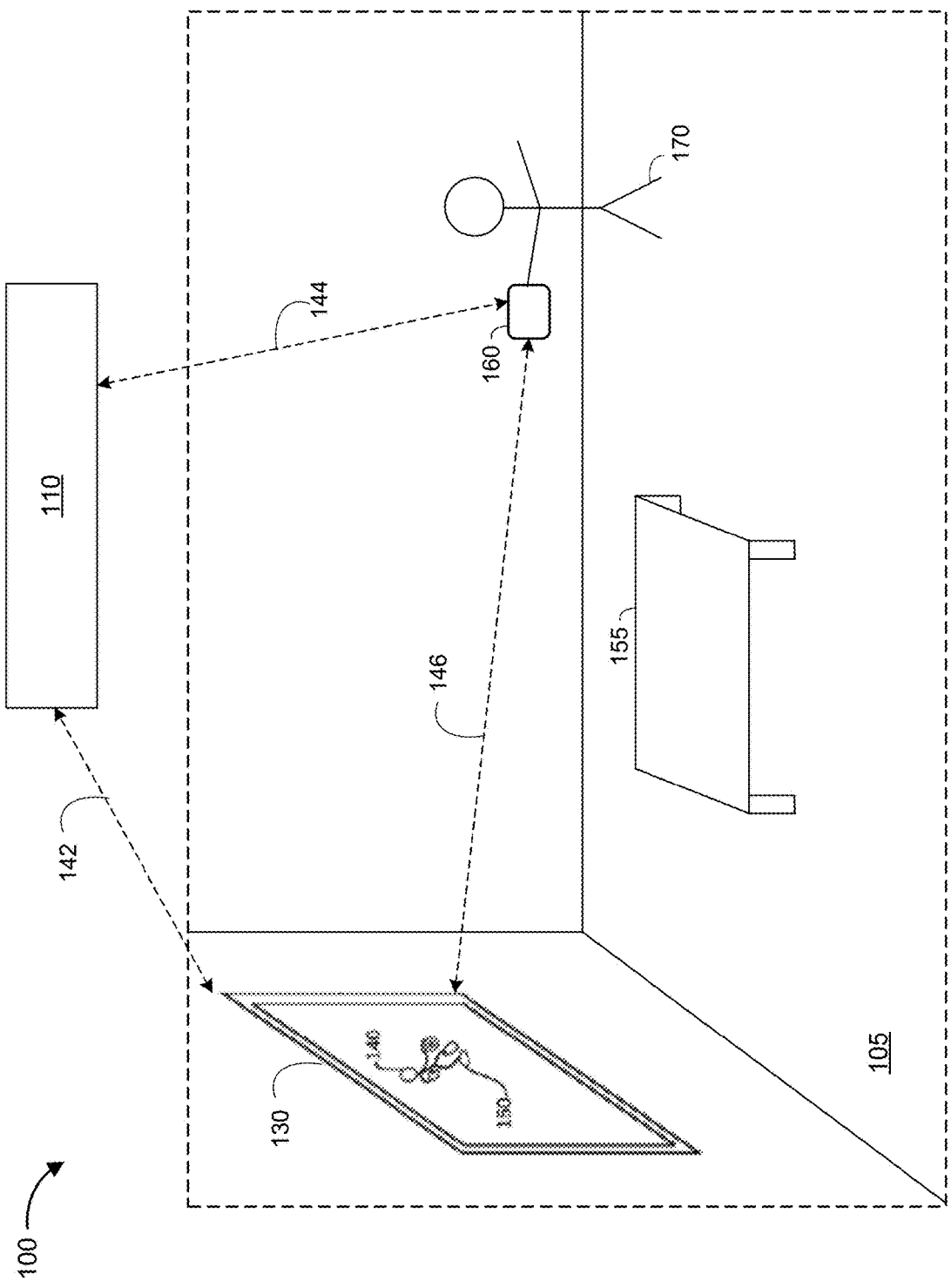
FIG. 1 illustrates an example operating environment for generating an affordance-item pair in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating an affordance linked to a simulated reality (SR) item. According to some implementations, the method is performed at a device with one or more processors, non-transitory memory, and one or more displays. The method includes identifying an item. The method also includes generating an affordance-item pair that corresponds to the item. The method further includes detecting a user input selecting the affordance-item pair. The method additionally includes displaying, on the one or more displays, an SR environment that includes an SR representation of the item in response to detecting the user input selecting the affordance-item pair. In some implementations, the method includes obtain an image data frame that includes the item.

Various implementations disclosed herein include devices, systems, and methods for displaying, an indication of a real-world interaction with a second item as a simulated reality (SR) overlay on the first item. According to some implementations, a method is performed at a device with one or more processors, non-transitory memory, and one or more displays. The method includes displaying an SR environment to a first user of a first item using the one or more displays. The method also includes obtaining an indication of a real-world interaction with a second item by a second user. The method further includes displaying, on the one or more displays, an SR representation of the indication of the real-world interaction with the second item as an overlay on the first item that is visible within the SR environment.

In accordance with some implementations, a device includes one or more processors, non-transitory memory, one or more displays, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions, which, when executed by one or more processors of a device with one or more displays, cause the device to perform or cause performance of the operations of any of the methods described herein. In accordance with some implementations, a device includes: one or more displays; a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described here.

As described herein, a physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a simulated reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, an SR system may detect an individual walking a few paces forward and, responsive thereto, adjust graphics and audio presented to the individual in a manner similar to how such scenery and sounds would change in a physical setting. Modifications to attribute(s) of virtual object(s) in an SR setting also may be made responsive to representations of movement (e.g., audio instructions).

An individual may interact with and/or sense an SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head-mounted systems. A head-mounted system may have an opaque display and speaker(s). Alternatively, a head-mounted system may be designed to receive an external display (e.g., a smartphone). The head-mounted system may have imaging sensor(s) and/or microphones for taking images/video and/or capturing audio of the physical setting, respectively. A head-mounted system also may have a transparent or semi-transparent display. The transparent or semi-transparent display may incorporate a substrate through which light representative of images is directed to an individual's eyes. The display may incorporate light-emitting diodes (LEDs), organic light-emitting diodes (OLEDs), a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a hologram). Other examples of SR systems include heads-up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

FIG. 1 illustrates an example operating environment 100 for generating an affordance-item pair in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the example operating environment 100 includes at least a controller 110, an SR device 160, and a display device 130.

In some implementations, the controller 110 is configured to manage and coordinate an SR experience for a user 170. In some implementations, the controller 110 includes a suitable combination of software, firmware, and/or hardware. The controller 110 is described in greater detail below with respect to FIG. 8. In some implementations, the controller 110 is a computing device that is local or remote relative to a scene 105. For example, the controller 110 is a local server situated within the scene 105. In another example, the controller 110 is a remote server situated outside of the scene 105 (e.g., a cloud server, central server, etc.). In some implementations, the controller 110 is communicatively coupled with the SR device 160 via one or more wired or wireless communication channels 144 (e.g., BLUETOOTH, Institute of Electrical and Electronics Engineers (IEEE) 802.11x, IEEE 802.16x, IEEE 802.3x, etc.). In some implementations, the controller 110 is communicatively coupled with the display device 130 via one or more wired or wireless communication channels 142 (e.g., BLUETOOTH, IEEE 802.11x, IEEE 802.16x, IEEE 802.3x, etc.).

In some implementations, the SR device 160 is configured to present the SR experience to the user 170. In some implementations, the SR device 160 includes a suitable combination of software, firmware, and/or hardware. In some implementations, the functionalities of the controller 110 are provided by and/or combined with the SR device 160. In some implementations, the SR device 160 is communicatively coupled with the display device 130 via one or more wired or wireless communication channels 146 (e.g., BLUETOOTH, IEEE 802.11x, IEEE 802.16x, IEEE 802.3x, etc.).

According to some implementations, while presenting an SR experience, the SR device 160 is configured to present SR content and to enable video pass-through of the scene 105 while the user 170 is virtually and/or physically present within the scene 105. For example, as shown in FIG. 1, the user 170 is able to see both a table 155 and the display device 130 via video pass-through of the scene 105. In some implementations, while presenting an SR experience, the SR device 160 is configured to present SR content and to enable optical see-through of the scene 105. For example, as shown in FIG. 1, the user 170 is able to see both the table 155 and the display device 130 via optical see-through of the scene 105.

In some implementations, the user 170 wears the SR device 160 on his/her head. As such, the SR device 160 includes one or more displays provided to display the SR content (e.g., one display for each eye of the user 170). For example, the SR device 160 encloses the field-of-view of the user 170. In some implementations, the SR device 160 is replaced with an SR chamber, enclosure, or room configured to present SR content in which the user 170 does not wear the SR device 160.

In some implementations, the user 170 holds the SR device 160 in his/her hand(s). For example, the user 170 points an external-facing image sensor of the SR device 160 at the display device 130. As such, with reference to the previous example, the display of the SR device 160 displays SR content superimposed on the display device 130 while the display device 130 is in the field-of-view of the external-facing image sensor of the SR device 160.

In some implementations, the display device 130 is configured to present media content (e.g., video and/or audio content) to the user 170. For example, the display device 130 presents a live video feed of a basketball game that includes a basketball player 140 wearing a particular basketball shoe 150 that the user 170 is interested in. In some implementations, the display device 130 corresponds to a television (TV) or a computing device such as a desktop computer, kiosk, laptop computer, tablet, mobile phone, projection device, or the like. In some implementations, the display device 130 includes a suitable combination of software, firmware, and/or hardware. The display device 130 is described in greater detail below with respect to FIG. 10. In some implementations, the functionalities of the display device 130 are provided by and/or combined with the SR device 160.

FIGS. 2A-2F illustrates an example SR presentation scenario 200 in accordance with some implementations. While pertinent features are shown, those of ordinary skill in art will appreciate from the present disclosure that various other features have not been illustrated for the sake of brevity and so as not to obscure more pertinent aspects of the example implementations disclosed herein.

Figure 2A:
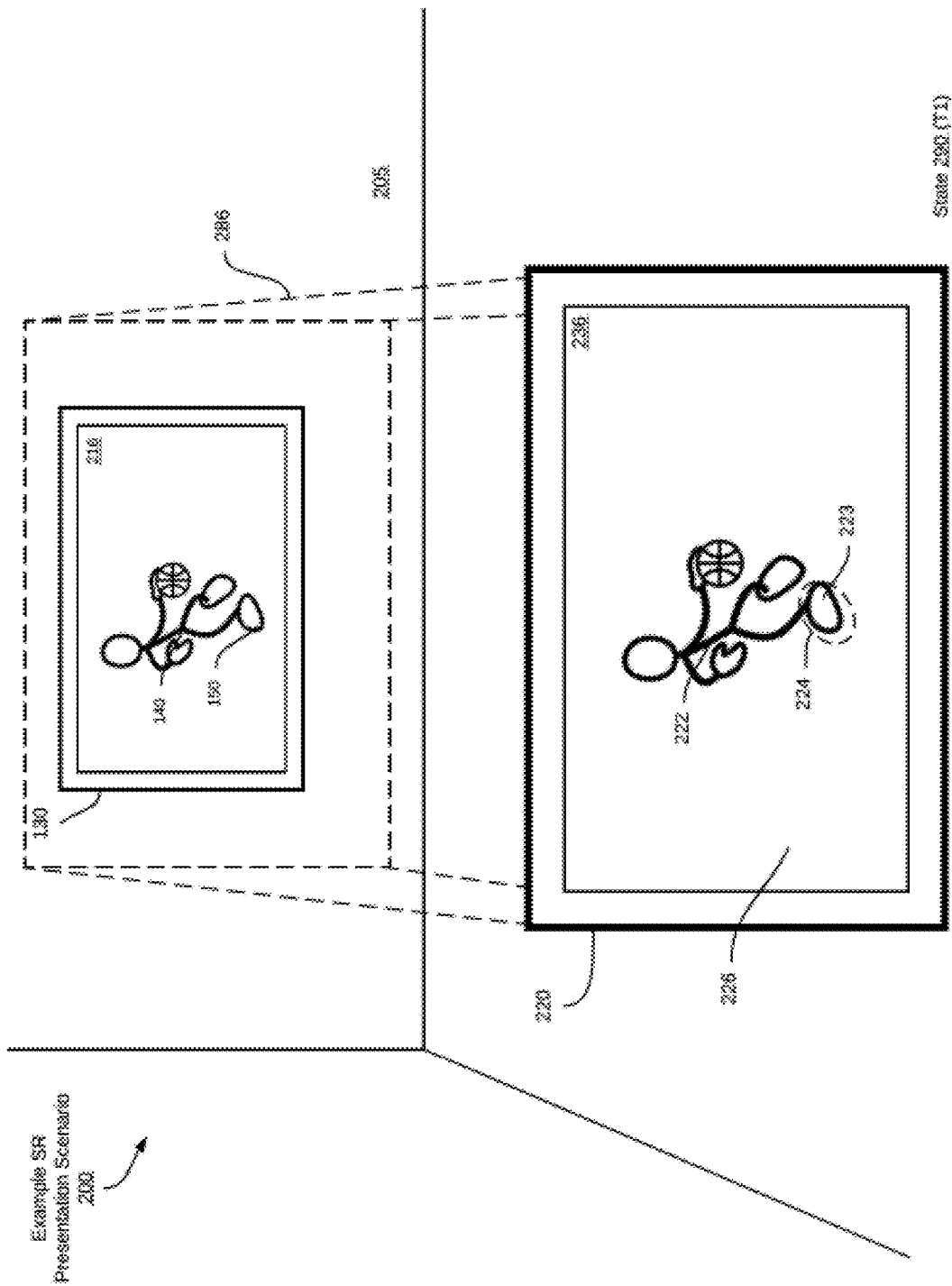
FIGS. 2A-2F illustrate an example simulated reality (SR) presentation environment for generating an affordance-item pair in accordance with some implementations.

FIG. 2A illustrates a first state 290 (e.g., associated with T1 or a first time period) of the example SR presentation scenario 200. In the first state 290, at least a portion of a scene 205 is within the field-of-view 286 of an external-facing image sensor of a user device 220 (e.g., a laptop, tablet, mobile phone, wearable, or the like). As shown in FIG. 2A, the scene 205 includes a display device 130 presenting a live video feed 216 of a basketball game that includes a basketball player 140 wearing a basketball shoe 150. As such, in FIG. 2A, the user device 220 displays, on a display screen 226, a representation 236 of the live video feed 216 of the basketball game currently presented by the display device 130 (e.g., video pass-through, optical see-through, or the like). As shown in FIG. 2A, the representation 236 of the live video feed 216 of the basketball game includes a representation 222 of a basketball player (e.g., the basketball player 140 in the live video feed 216 of the basketball game) and a representation 223 of an item (e.g., the basketball shoes 150 worn by the basketball player 140 in the live video feed 216 of the basketball game).

As shown in FIG. 2A, a user of the user device 220 may be interested in an item (e.g., the basketball shoe 150 worn by the basketball player 140) associated with the live video feed 216 of the basketball game currently presented on the display device 130. For example, the user may wish to know more information about the basketball shoe 150 worn by the basketball player 140. In another example, the user may wish to take a closer look at the basketball shoe 150 worn by the basketball player 140. In yet another example, the user may wish to see additional angles of the basketball shoe 150 worn by the basketball player 140.

In some implementations, a controller 110 communicatively coupled with the user device 220 identifies the item within the image data frame according to instance segmentation, semantic segmentation, and/or other computer vision techniques. In some implementations, the user device 220 identifies the item within the image data frame according to instance segmentation, semantic segmentation, and/or other computer vision techniques. In some implementations, identifiable items correspond to real-world items such as a shoe, a person, an animal, a place, or the like. In some implementations, the controller 110 identifies a plurality of items within the image data frame. In some implementations, the user device 220 identifies the plurality of items within the image data frame.

In some implementations, the user device 220 generates an affordance-item pair 224 that associates the representation 223 of the basketball shoe 150 corresponding to a representation 222 of the basketball player 140 in the image data frame with a visual affordance. As shown in FIG. 2A, the affordance-item pair 224 corresponds to a visual affordance that is selectable (e.g., by way of a touch input, voice command, gestural command, gaze direction, or the like). In some implementations, when the affordance-item pair 224 is visible, a boundary border is overlaid on the representation 223 of the basketball shoe 150 in the image data frame. However, in some implementations, the affordance-item pair 224 may not be visible.

In some implementations, the user device 220 corresponds to a pair of AR glasses with SR content displayed thereon, a tablet or mobile phone with SR content displayed thereon, or a head-mounted device (HMD) with SR content displayed thereon. In the HMD scenario, assuming that the display device 130 is present, the representation 236 of the live video feed 216 of the basketball game corresponds to video pass-through or optical see-through of the display device 130. In this example, the SR content is composited with the video pass-through or optical see-through of the live video feed 216 of the basketball game displayed by the display device 130. In the HMD scenario, assuming that the display device 130 is not present, the live video feed 216 of the basketball game is projected onto the retina of the user. In this example, the SR content is composited with the live video feed 216 and, in turn, projected onto the retina of the user.

Figure 2B:
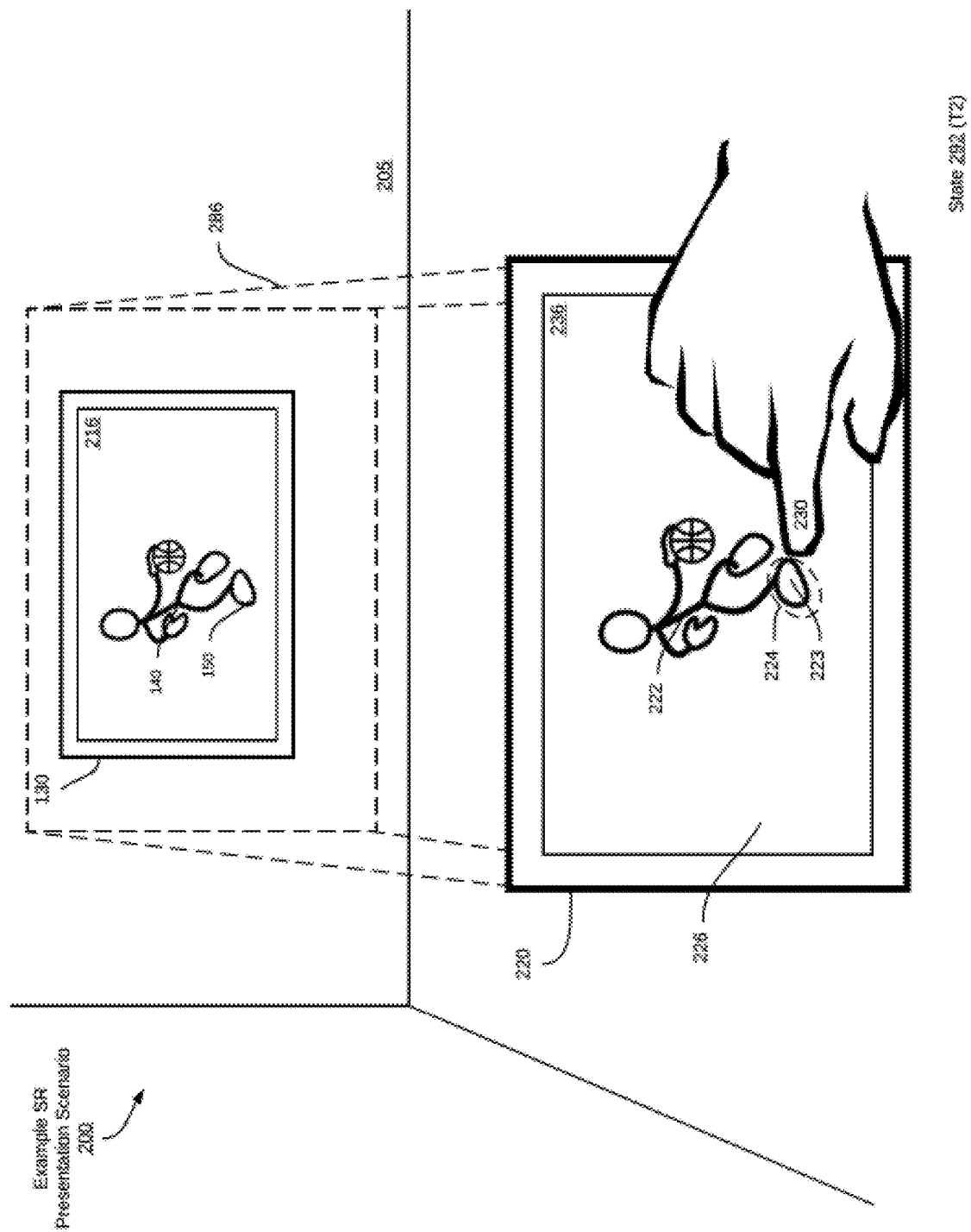

FIG. 2B illustrates a second state 292 (e.g., associated with T2 or a second time period) of the example SR presentation scenario 200. In FIG. 2B, the user device 220 detects a user input 230 (e.g., a touch input such as a single or double tap gesture) from the user at a location corresponding to the affordance-item pair 224. For example, the user wishes to glean further information or perspectives associated with the basketball shoe 150 (e.g., item of interest). In some implementations, the user input may be selectable from a voice command, gestural command, gaze direction, or the like.

In some implementations, assuming that the user device 220 corresponds to a pair of AR glasses worn by the user, the user device 220 detects a voice command, gaze direction, body pose direction/gesture, or the like from the user that indicates selection of the representation 223 of the basketball shoe 150 (e.g., the item of interest). In some implementations, assuming that the user device 220 corresponds to an HMD, the user device 220 detects a voice command, gaze direction, body pose direction/gesture, or the like from the user that indicates selection of the representation 223 of the basketball shoe 150 (e.g., the item of interest) within an SR environment. In some implementations, the user device 220 may infer a user input based on images of the scene 205 captured by an external-facing image sensor of the user device 220 or other sensor information such as body pose information, gaze direction, or the like. However, those skilled in the art will appreciate that there are many ways of selecting an item. For the sake of brevity, an exhaustive listing of all such methods of selecting an item is not provided herein.

In response to detecting the user input 230 in FIG. 2B, the user device 220 may display an SR environment 256 in a variety of different ways depending on user preference, content, content medium, user device type, application usage, and/or the like. As non-limiting examples, FIGS. 2C-2F illustrate different ways to view the SR environment 256 that each include an SR representation 240 of the basketball shoe 150 in response to detecting the user input 230 selecting the affordance-item pair 224 in FIG. 2B.

Figure 2C:
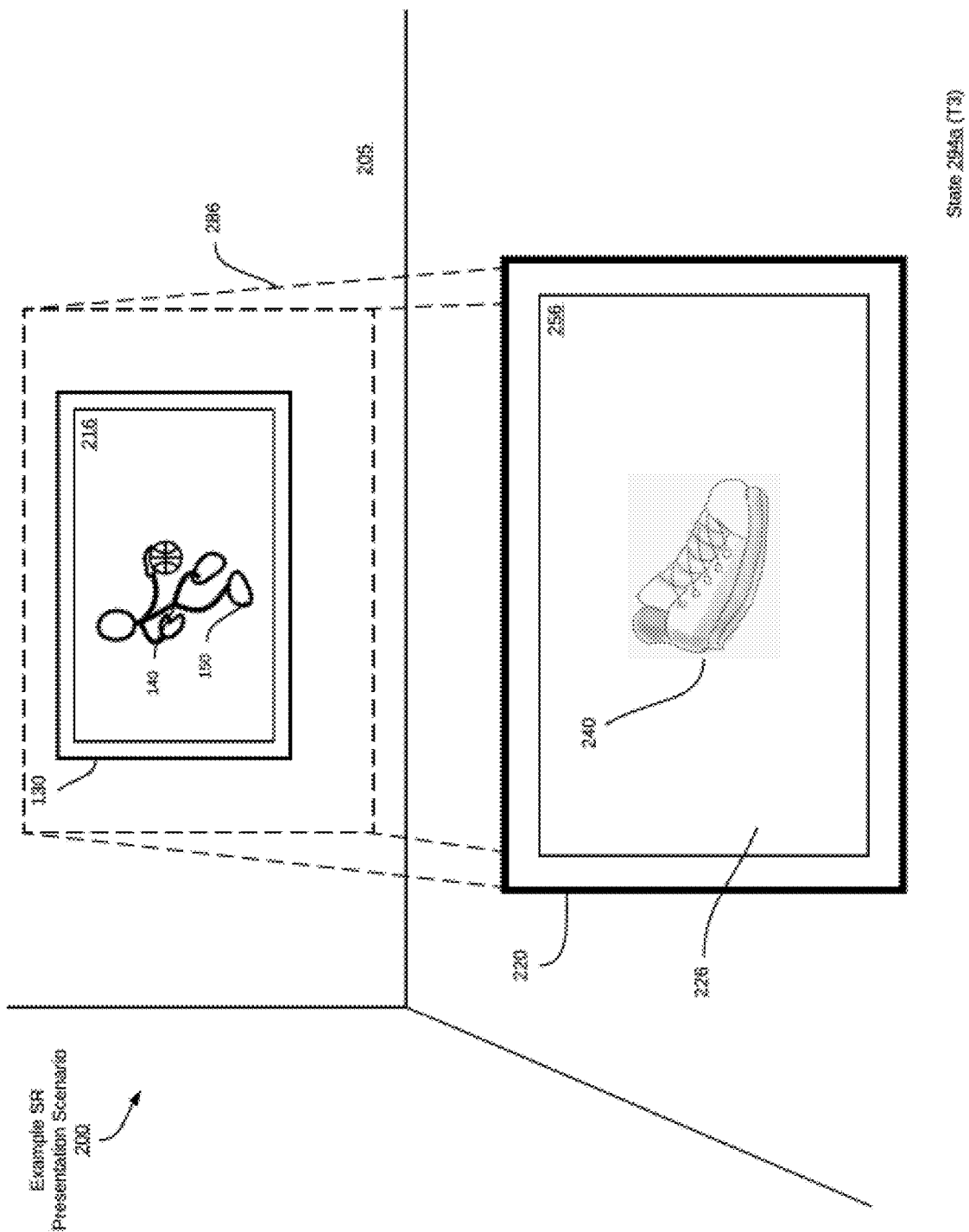

FIG. 2C illustrates a third state 294a (e.g., associated with T3 or a third time period) of the example SR presentation scenario 200. In FIG. 2C, the user device 220 replaces display of the representation 236 of the live video feed 216 of the basketball game with the SR environment 256 that includes the SR representation 240 of the basketball shoe 150 in response to detecting the user input 230 selecting the affordance-item pair 224 in FIG. 2B. In contrast to FIGS. 2A and 2B, the display screen 226 of the user device 220 no longer displays the live video feed 216 of the basketball game currently presented by the display device 130. Instead, the user device 220 transitions to display of the SR environment 256 that includes the SR representation 240 of the basketball shoe 150.

In the third state 294a, the live video feed 216 of the basketball game may be paused on the display device 130 or bookmarked at the user device 220 such that the user can resume viewing the live video feed 216 of the basketball game after he/she finishes viewing the SR representation 240 of the basketball shoe 150 within the SR environment 256. In some implementations, the user can interact with and manipulate the SR representation 240 of the basketball shoe 150 in the same way that the user would interact with a real-world item. In some implementations, the SR representation 240 of the basketball shoe 150 can be viewed from a plurality of perspectives and zoom levels. In some implementations, the SR representation 240 of the basketball shoe 150 can be edited in various ways such as adding SR content, removing SR content, increasing/decreasing the size of SR content, changing the color of SR content, and/or the like.

Figure 2D:
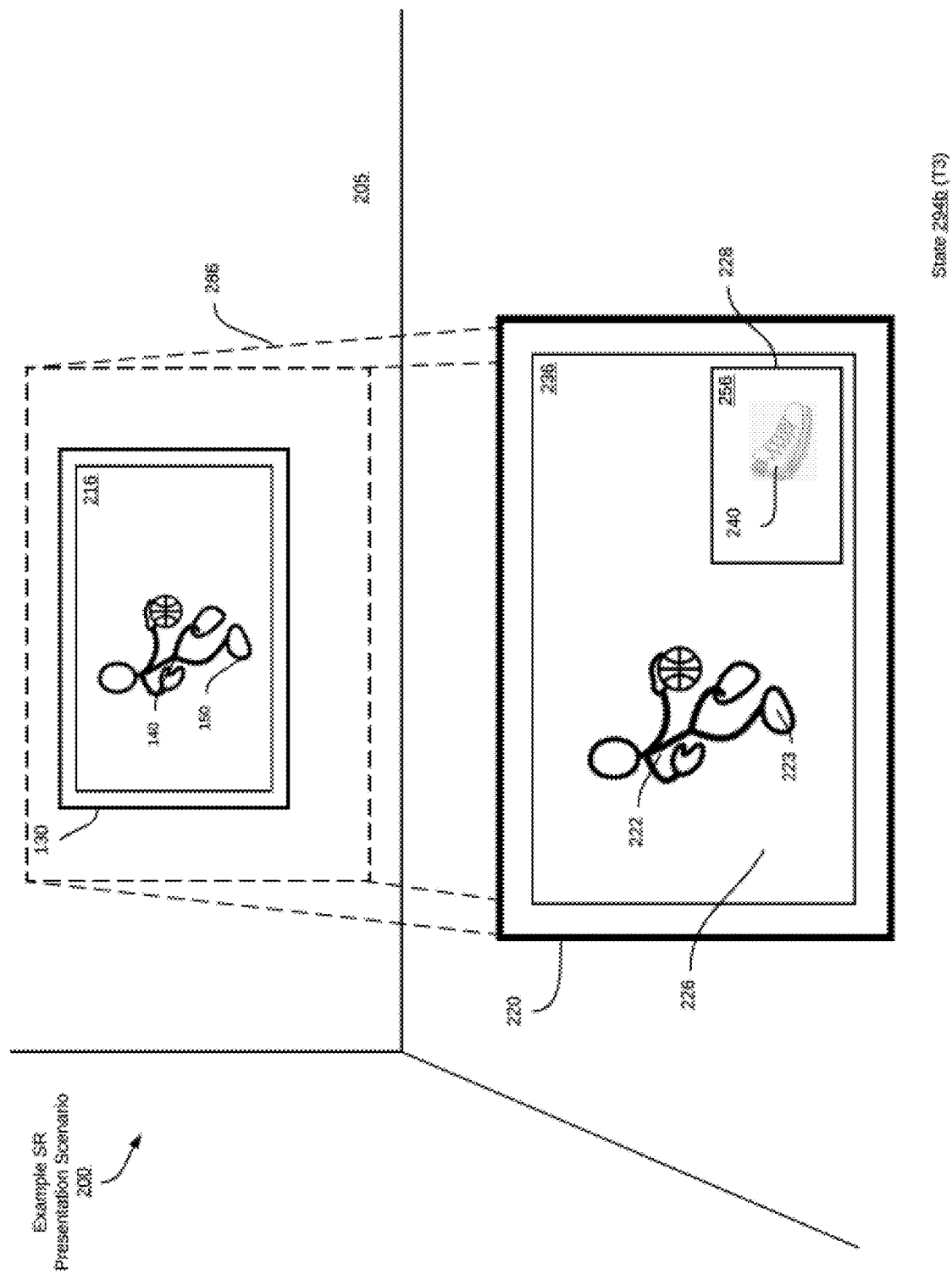

FIG. 2D illustrates another third state 294b (e.g., associated with T3 or a third time period) of the example SR presentation scenario 200. In FIG. 2D, the user device 220 displays a picture-in-picture (PiP) window 228 along with the representation 236 of the live video feed 216 of the basketball game in response to detecting the user input 230 selecting the affordance-item pair 224 in FIG. 2B. For example, the PiP window 228 includes the SR environment 256 with the SR representation 240 of the basketball shoe 150. However, in contrast to FIG. 2C, the user device 220 concurrently displays, on the display screen 226, both: (A) the representation 236 of the live video feed 216 currently presented by the display device 130 and (B) the SR environment 256 including the SR representation 240 of the basketball shoe 150. In comparison to FIG. 2C, FIG. 2D illustrates an alternative response to the user input 230 in FIG. 2B.

Figure 2E:
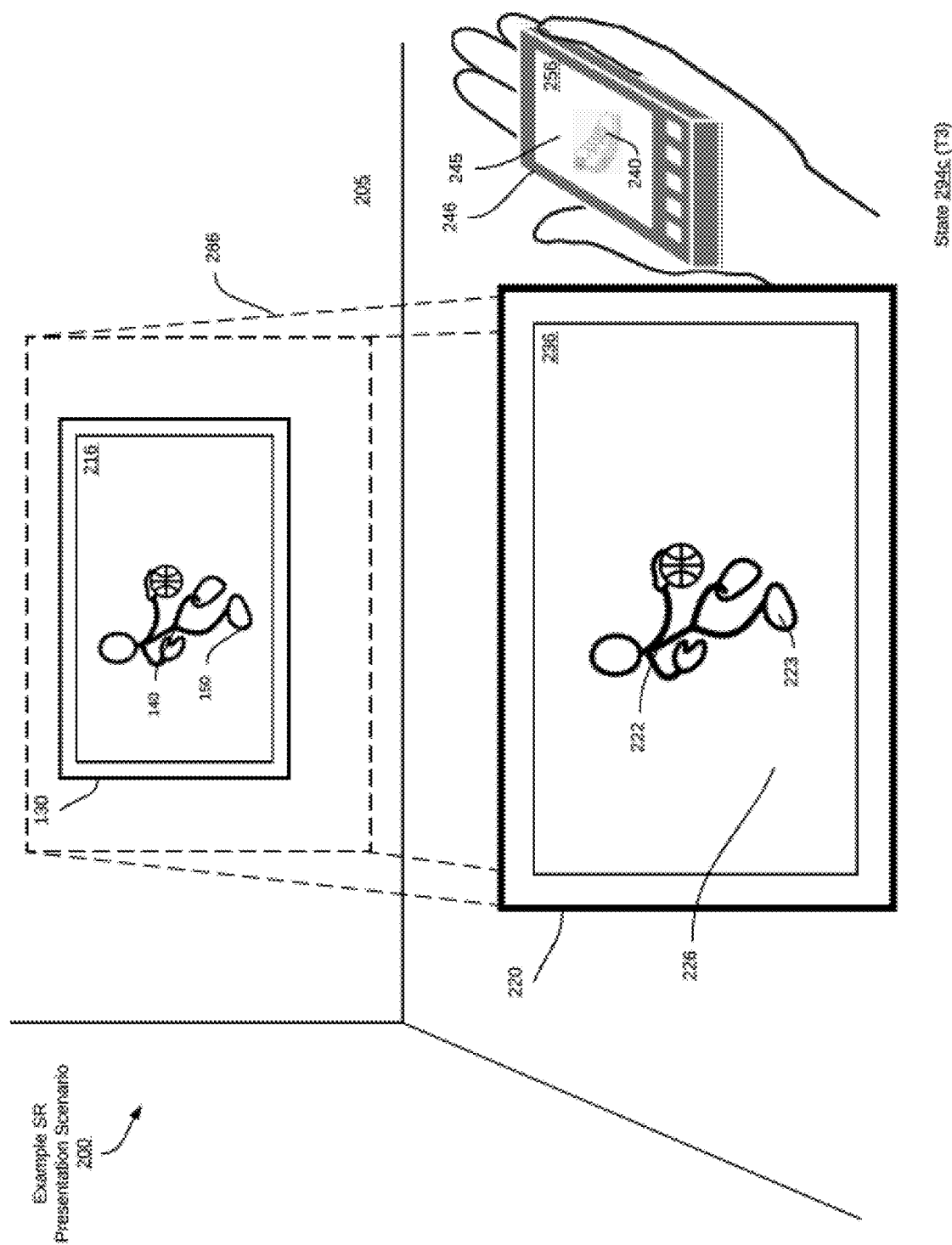

FIG. 2E illustrates yet another third state 294c (e.g., associated with T3 or a third time period) of the example SR presentation scenario 200. In FIG. 2E, the user device 220 generates and sends the SR environment 256 including the SR representation 240 of the basketball shoe 150 to an auxiliary device 246 in response to detecting the user input 230 selecting the affordance-item pair 224 in FIG. 2B. This process allows the user to view the SR environment 256 including the SR representation 240 of the basketball shoe 150 on a display 245 of the auxiliary device 246 while the representation 236 of the live video feed 216 continues to play interrupted on the user device 220. In comparison to FIGS. 2C-2D, FIG. 2E illustrates an alternative response to the user input 230 in FIG. 2B.

Figure 2F:
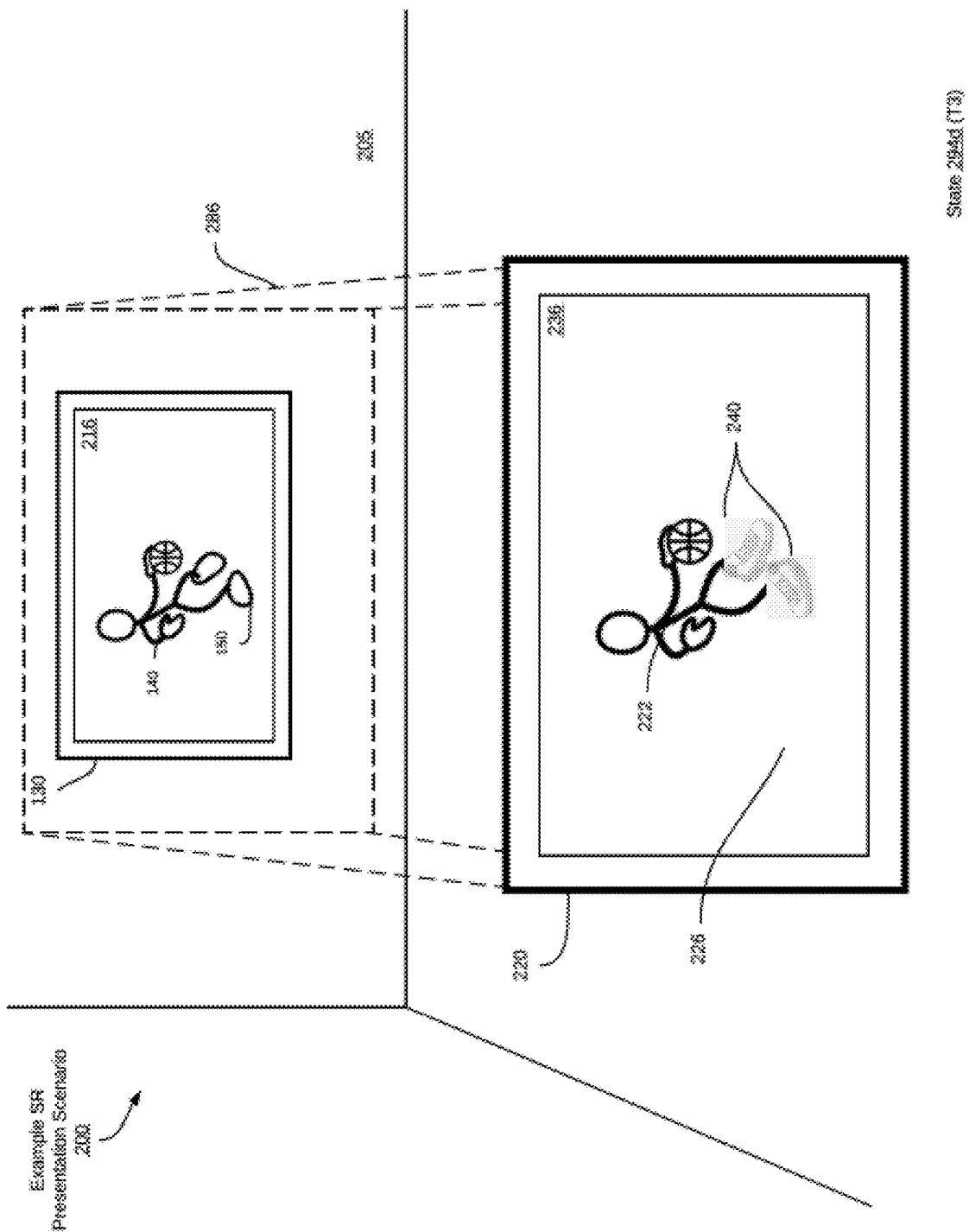

FIG. 2F illustrates yet another third state 294d (e.g., associated with T3 or a third time period) of the example SR presentation scenario 200. In FIG. 2F, the user device 220 displays the SR representation 240 of the basketball shoe 150 as an overlay on the representation 236 of the live video feed 216 of the basketball game in response to detecting the user input 230 selecting the affordance-item pair 224 in FIG. 2B. The SR representation 240 of the basketball shoe 150 is overlaid directly onto the representation 236 of the live video feed 216 such that the user views the SR representation 240 of the shoe in place of the basketball shoe 150 on the live video feed 216. For example, an overlay of the SR representation 240 of the basketball shoe 150 is overlaid on the representation 236 of the live video feed 216 such that the representation 222 of the basketball player 140 appears to be wearing the SR representation 240 of the basketball shoe 150 within the representation 236 of the live video feed 216 of the basketball game. In some implementations, the user device 220 generates and sends the SR environment 256 including the SR representation 240 of the basketball shoe 150 to an auxiliary device 246 of a second user in response to detecting the user input 230 selecting the affordance-item pair 224 in FIG. 2B. In comparison to FIGS. 2C-2E, FIG. 2F illustrates an alternative response to the user input 230 in FIG. 2B.

Figure 3:
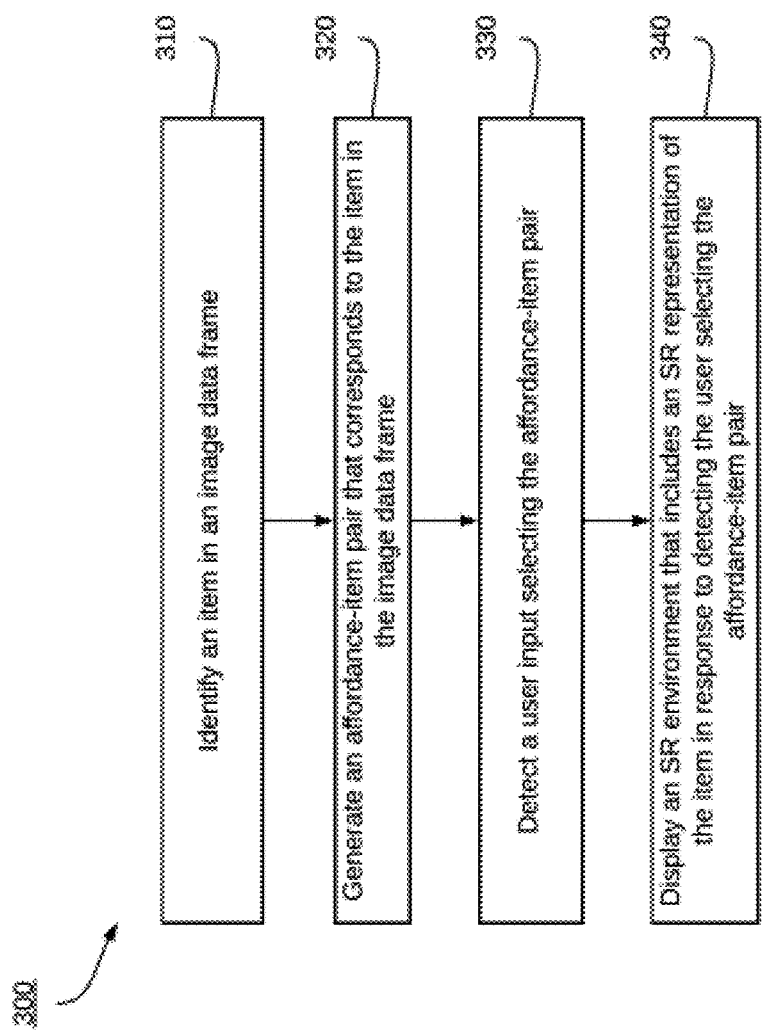
FIG. 3 illustrates a flow diagram of a method of generating an affordance-item pair in accordance with some implementations.

FIG. 3 is a flowchart representation of a method 300 of generating an affordance linked to an SR representation of an item recognized in an image data frame in accordance with some implementations. In some implementations, the method 300 is performed by a device (e.g., the SR device 160 shown in FIG. 1, the controller 110 shown in FIGS. 1 and 8, the user device 220 shown in FIGS. 2A-2F, the device 901 shown in FIG. 9, or a suitable combination thereof) with one or more processors, non-transitory memory, and one or more displays. In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, the method 300 includes identifying an item in an image data frame. The item (e.g., the basketball shoe 150 in FIGS. 2A-2F) corresponds to any real-world item such as clothing, objects, persons, animals, foods, beverages, toys, furniture, electronics, medical devices, beauty products, or the like. For example, as shown in FIG. 1 and FIGS. 2A-2F, the basketball shoe 150 in the image data frame corresponds to a real-world clothing item. In another example, the item in the image data frame corresponds to a person, actor, sports athlete, or the like. For example, while watching a basketball game, a user may want to glean further information or statistics about a particular basketball player without leaving a video feed.

In some implementations, the device identifies the item in the image data frame according to instance segmentation techniques, semantic segmentation techniques, computer vision techniques, or the like. In some implementations, the item is pre-defined by the associated video feed. In some implementations, a third party or owner of the item provides the item, affordance-item pair, and/or corresponding SR representations of the item. In some implementations, the SR representation of the item is subject to digital rights management (DRM) protection in order to restrict manipulation of the SR representation of the item. DRM protection protects the appearances of the item such that only an owner of the item, creator of the item, or authorized user may control or edit a visual appearance of an SR representation of the item. For example, an owner of a shoe may not want an unauthorized user or a third party to change the appearance of the SR representation of the shoe to include profanity, a competitor logo, copyrighted content, or the like.

In some implementations, identifying the item further comprises determining if the item is available for display in an SR environment to the user. In some implementations, if the item is not available for display, the device will recommend a similar or alternative item. In some implementations, identifying the item further comprises obtaining an item manifest associated with a video feed or the like that includes a plurality of items. In some implementations, the device identifies two or more items in the image data frame such that an affordance is overlaid on at least a portion of each of the two or more items.

In some implementations, the method further includes obtaining the image data frame from an image (e.g., a still image such as a magazine, poster, billboard, or the like), a video feed (e.g., recorded feed, live feed, video from a database, or the like), or a camera that captures real-world image data. In some implementations, a pair of AR glasses or HMD includes a forward-facing camera that captures real-world image data from live events. The pair of AR glasses or HMD is connected to a controller that identifies the item in the image data frame and generates an affordance-item pair corresponding to the item in the image data frame. However, those skilled in the art will appreciate that there are many ways of obtaining an image data frame. For the sake of brevity, an exhaustive listing of all such methods of selecting an item is not provided herein.

As represented by block 320, the method 300 includes generating an affordance-item pair (e.g., the affordance-item pair 224 shown in FIGS. 2A and 2B) that corresponds to the item in the image data frame. In some implementations, the device retrieves the affordance-item pair from a database. In some implementations, the method 300 further includes compositing an affordance with the image data frame.

As represented by block 330, the method 300 includes detecting a user input selecting the affordance-item pair 224. For example, FIG. 2B shows a user device 220 detecting a user input 230 from a user at a location corresponding to the affordance-item pair 224. As mentioned above, there are various ways for the device to detect a user input depending on the operating environment. In some implementations, a user views the item in the image data frame through a pair of AR glasses with SR content displayed thereon such that the user makes selections items directly on the AR glasses. In some implementations, a user views the item in the image data frame using an HMD device with SR content displayed thereon such that the user makes selections within an SR environment. In yet another implementation, a camera may capture a scene that includes a body pose and gestures of a user such that the camera infers user input. In some implementations, the user input may be selectable from a voice command, gestural command, gaze direction, or the like.

In some implementations, the device recognizes multiple selection input types such as a pointing gesture, a tap gesture, a swipe gesture, flick gesture, or the like. In some implementations, the multiple selection input types correspond to different commands and actions. For example, a first selection input type transitions from the video feed to the SR environment. As another example, a second selection input type saves an item to an SR clipboard or environment for viewing at a later time.

As represented by block 340, the method 300 includes displaying an SR environment that includes an SR representation (e.g., the SR representation 240 of the basketball shoe 150 shown in FIGS. 2C-2F) of the item in response to detecting the user input selecting the affordance-item pair.

As non-limiting examples, FIGS. 2C-2F illustrate examples of displaying the SR environment that includes the SR representation of the item. In some implementations, as shown in FIG. 2C, the device 220 transitions between displaying a representation of a live video feed 216 and an SR environment 256. When the device 220 switches from the representation 236 of the live video feed 216 to the SR environment 256, the device 220 may pause or bookmark the representation of the live video feed in order to minimize interruption to the user. In some implementations, as shown in FIG. 2D, the device 220 may concurrently display the representation of the live video feed 236 and the SR environment 256 (e.g., the SR environment is displayed in a PiP window 228 or split screen mode). In some implementations, as shown in FIG. 2E, the device 220 generates and sends the SR environment 256 to an auxiliary device 246. In some implementations, as shown in FIG. 2F, the device 220 overlays the SR environment on the image data frame such that the user views the SR representation 240 of the basketball shoe 150 in place of the basketball shoe 150 on the live video feed 216. For example, the overlay of the SR representation 240 of the basketball shoe 150 is overlaid directly on the representation 236 of the live feed 216 such that the representation 222 of the basketball player 140 appears to be wearing the SR representation 240 of the basketball shoe 150 within the representation 236 of the live video feed 216 of the basketball game.

In some implementations, a user interacts with the SR representation of the item in the same way the user interacts with a real-world item. In some implementations, the SR representation of the item may be picked up and rotated to view different angles of the item. In some implementations, the SR representation of the item corresponds to a stereoscopic image. In some implementations, the SR representation of the item is viewable from a plurality of perspectives and zoom levels within the SR environment. In some implementations, the SR environment includes an affordance that links to a webpage associated with the SR representation of the item (e.g., a retail outlet, informational page associated with the item, social media pages related to the item, or the like).

In some implementations, the device generates additional SR content that corresponds to the item. In some implementations, the additional SR content is related to the item as an accessory, a recommended item or a replacement item.

Figure 4:
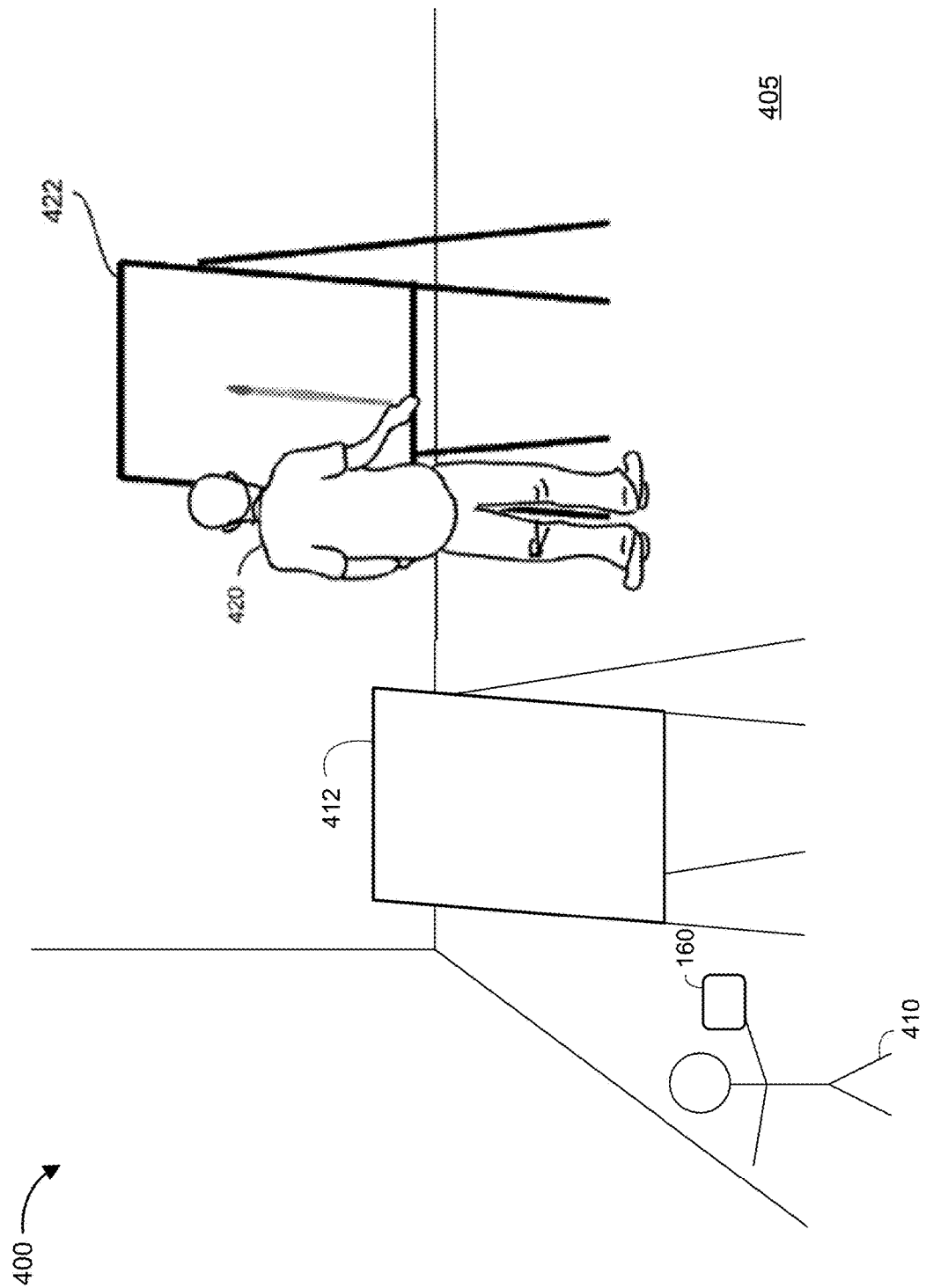
FIG. 4 is a block diagram of an example operating environment for displaying an indication of a real-world interaction with a second item as an overlay on a first item in accordance with some implementations.

FIG. 4 illustrates an example operating environment 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the example operating environment 400 includes a first user 410, a first item 412 associated with the first user 410 (e.g., a first paint easel), an SR device 160 held by the first user 410, a second user 420, and a second item 422 associated with the second user 420 (e.g., a second paint easel).

In some implementations, both the first user 410 and the second user 420 are present within the same location in the physical setting, scene 405. For example, the first user 410 and the second user 420 may be in the same classroom such that the second user 420 is an instructor and the first user 410 is a student receiving live instruction. As shown in FIG. 4, the first user 410 may be unable to see real-world interactions (e.g., paint strokes) performed on the second item 422 (e.g., the second paint easel of the instructor) by the second user 420. For example, the first user 410 may be unable to see the interactions due to obstructions in the line-of-sight of the first user 410 (e.g., the first item 412 blocks the view of the first user 410), the distance between the first user 410 and the second item 422, the angle between the first user 410 and the second item 422, or the like.

In some implementations, the first user 410 and the second user 420 may be situated in different locations. For example, the first user 410 is situated in a first location while watching a live video feed of the second user 420 situated in a second location. As another example, the first user 410 may be watching a pre-recorded video feed of the second user 420.

Figure 5:
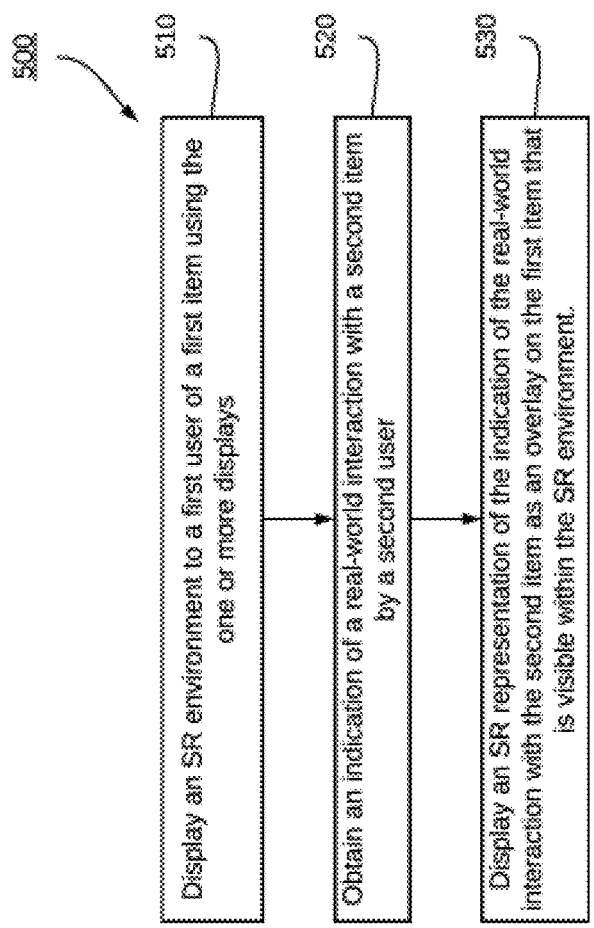
FIG. 5 illustrates a flow diagram of a method of obtaining and displaying an SR representation of an indication of a real-world interaction with an item in accordance with some implementations.

FIG. 5 is a flowchart representation of a method 500 of displaying an indication of a real-world interaction with a second item as the overlay on a first item in accordance with some implementations. In some implementations, the method 500 is performed by a device (e.g., the SR device 160 shown in FIGS. 1 and 4, the controller 110 shown in FIGS. 1 and 8, the user device 220 shown in FIGS. 6A, 6B, and 7A-7D, the device 901 shown in FIG. 9, or a suitable combination thereof) with one or more processors, non-transitory memory, and one or more displays. In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 510, the method 500 includes displaying an SR environment to a first user (e.g., the first user 410 shown in FIG. 4) of a first item (e.g., the first item 412 associated with the first user 410 shown in FIG. 4, the SR representation 630 of an item shown in FIGS. 6A and 6B, or a representation 716 of the first paint easel 714 shown in FIGS. 7A-7D) using the one or more displays. In some implementations, the first item corresponds to a physical item (e.g., the first paint easel 714 shown in FIGS. 7A-7D) associated with a tutorial such as a laptop, tablet, paint easel, or the like. In some implementations, the first item corresponds to an SR representation (e.g., the SR representation 630 of a keyboard shown in FIGS. 6A and 6B) of a physical item. In some implementations, the SR environment may correspond to a lecture, tutorial, live event, or the like.

As represented by block 520, the method 500 includes obtaining an indication of a real-world interaction with a second item (e.g., the second device 422 shown in FIG. 4, the real-world item 610 shown in FIGS. 6A and 6B, or the second paint easel 740 shown in FIGS. 7A-7D) by a second user (e.g., the second user 420 shown in FIG. 4, the hands 602 of a second user shown in FIGS. 6A and 6B, or the second user 730 shown in FIGS. 7A-7D). In some implementations, the first user and the second user are situated in the same location. In some implementations, the first user and the second user are situated in different locations.

In some implementations, the first item and the second item are identical. In some implementations, the first item and the second item are analogous items (e.g., the first item 412 corresponds to a sketchbook, and the second item 422 corresponds to a paint easel). In some implementations, the first item and the second item are different items (e.g., the first item 412 corresponds to a tablet device and the second item 422 corresponds to a paint easel).

In some implementations, the method 500 further includes synthesizing an SR representation of the indication of the real-world interaction with the second item within the SR environment. For example, the SR representation may correspond to the SR representation of inputs and interactions to the second item by the second user such as showing an SR representation of fingers typing, hand gestures, hand motions, or the like.

As represented by block 530, the method 500 includes displaying an SR representation of the indication of the real-world interaction with the second item as an overlay (e.g., the SR representation 632 shown in FIG. 6B or the first SR representation 712 shown in FIGS. 7B-7D and the second SR representation 724 shown in FIG. 7D) on the first item that is visible within the SR environment. In some implementations, the method 500 further includes generating annotations to the first item or the second item within the SR environment by the first user or the second user. For example, the first user may be taking notes in real time while viewing a lecture taught by the second user. In some implementations, the annotations are stored in a database.

FIGS. 6A and 6B illustrate a process for displaying an indication of a real-world interaction as an overlay in accordance with some implementations.

FIG. 6A illustrates a first state 690a (T1 or the first time period) of an example SR presentation scenario 600 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

FIG. 6A illustrates the first state 690a (T1 or the first time period) of a first scene 606 associated with a first user (e.g., the first user 410 shown in FIG. 4). The first scene 606 associated with the first user includes the first user operating a user device 220 (e.g., the user device 220 shown in FIGS. 2A-2F) that displays pass-through video of a portion of the first scene 606 (e.g., the top of a table 614) within a field-of-view 686 of an associated external-facing image sensor. For example, as shown in FIG. 6A, the user device 220 displays, on the display screen 226, a representation 636 of the portion of the first scene 606 within the field-of-view 686 of an associated external-facing image sensor. Accordingly, the user device 220 displays a representation 636 of the first scene 606 including a representation 640 associated with the table 614 and an SR representation 630 (e.g., a virtual keyboard) of an item that appears to be situated on top of the table 614.

FIG. 6A also illustrates the first state 690a (T1 or the first time period) of a second scene 608 associated with a second user (e.g., the second user 420 shown in FIG. 4) shows the hands 602 of the second user and a real-world item 610 (e.g., a keyboard). In the second scene 608 associated with the second user, the hands 602 of the second user are clasped together such that the second user is not touching or interacting with the real-world item 610. In some implementations, the first user and the second user are situated in the same location. In some implementations, the first user and the second user are situated in different locations.

In some implementations, the real-world item 610 corresponds to a real-world object such as a keyboard, laptop, phone, physical model, article of clothing, paint brush, vehicle, or the like. In some implementations, the SR representation 630 of an item and the real-world item 610 are identical. In some implementations, the SR representation 630 of the item and the real-world item 610 are associated with analogous items. For example, the real-world item 610 may be a keyboard and the SR representation 630 of the item may be a virtual representation of the same real-world item. In some implementations, the SR representation 630 of the item and the real-world item 610 are associated with different items. For example, the real-world item 610 may be a keyboard and the SR representation 630 of the item may be a virtual typewriter.

FIG. 6B illustrates a second state 690b (T2 or the second time period) of the example SR presentation scenario 600 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

FIG. 6B illustrates the second state 690b (T2 or the second time period) of the first scene 606 associated with the first user and the second state 690b (T2 or the second time period) of the second scene 608 associated with the second user. In contrast to the first state 690a of the second scene 608, the second state 690b of the second scene 608 associated with the second user shows the second user interacting with the real-world item 610 with his/her hands 602. Continuing with this example, the second user interacts with the real-world item 610 by touching several keys on the real-world item 610. In some embodiments, an external camera or a SR device 160 worn by the second user captures the scene 608 including the second user interacting with the real-world item 610. In the second state 690*b* of the first scene 606, the user device 220 associated with the first user displays, on the display screen 226, an SR representation 632 of an indication of the real-world interaction with the real-world item 610 (e.g., the second user typing with his/her fingers on the keyboard) in response to the second user interacting with the real-world item 610 in the second state 690*b* of the second scene 608. For example, as shown in FIG. 6B, the SR representation 632 corresponds to an overlay on the first item (e.g., virtual keyboard).

FIGS. 7A-7D illustrate another process for displaying an indication of a real-world indication of a real-world interaction as an overlay in accordance with some implementations.

FIG. 7A illustrates an example SR presentation scenario 700 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

FIG. 7A illustrates a first state 720*a* (T1 or the first time period) of a first scene 706 associated with a first user (e.g., the first user 410 shown in FIG. 4). The first scene 706 associated with the first user includes a first user operating a user device 220 (e.g., the user device 220 shown in FIGS. 2A-2F, 6A, and 6B) that includes a portion of the first scene 706 within a field-of-view 786 of an associated external-facing image sensor (e.g., a portion of a first paint easel 714). For example, as shown in FIG. 7A, the user device 220 displays, on the display screen 226, a representation 736 of the portion of the first scene 706 within the field-of-view 786 of the associated external-facing image sensor. Accordingly, the user device 220 displays a representation 736 of the first scene 706 including a representation 716 associated with the first paint easel 714.

FIG. 7A also illustrates the first state 720*a* (T1 or the first time period) of a second scene 708 associated with a second user 730 (e.g., the second user 420 shown in FIG. 4) including the second user 730 holding a first paintbrush 750 (e.g., a fine/thin paintbrush) and a second paint easel 740. In the first state 720*a* of the second scene 708 associated with the second user, the second user 730 has not used the first paintbrush 750 to interact with the second paint easel 740. In some implementations, the first user and the second user 730 are situated in the same location. In some implementations, the first user and the second user 730 are situated in different locations.

Figure 7B:
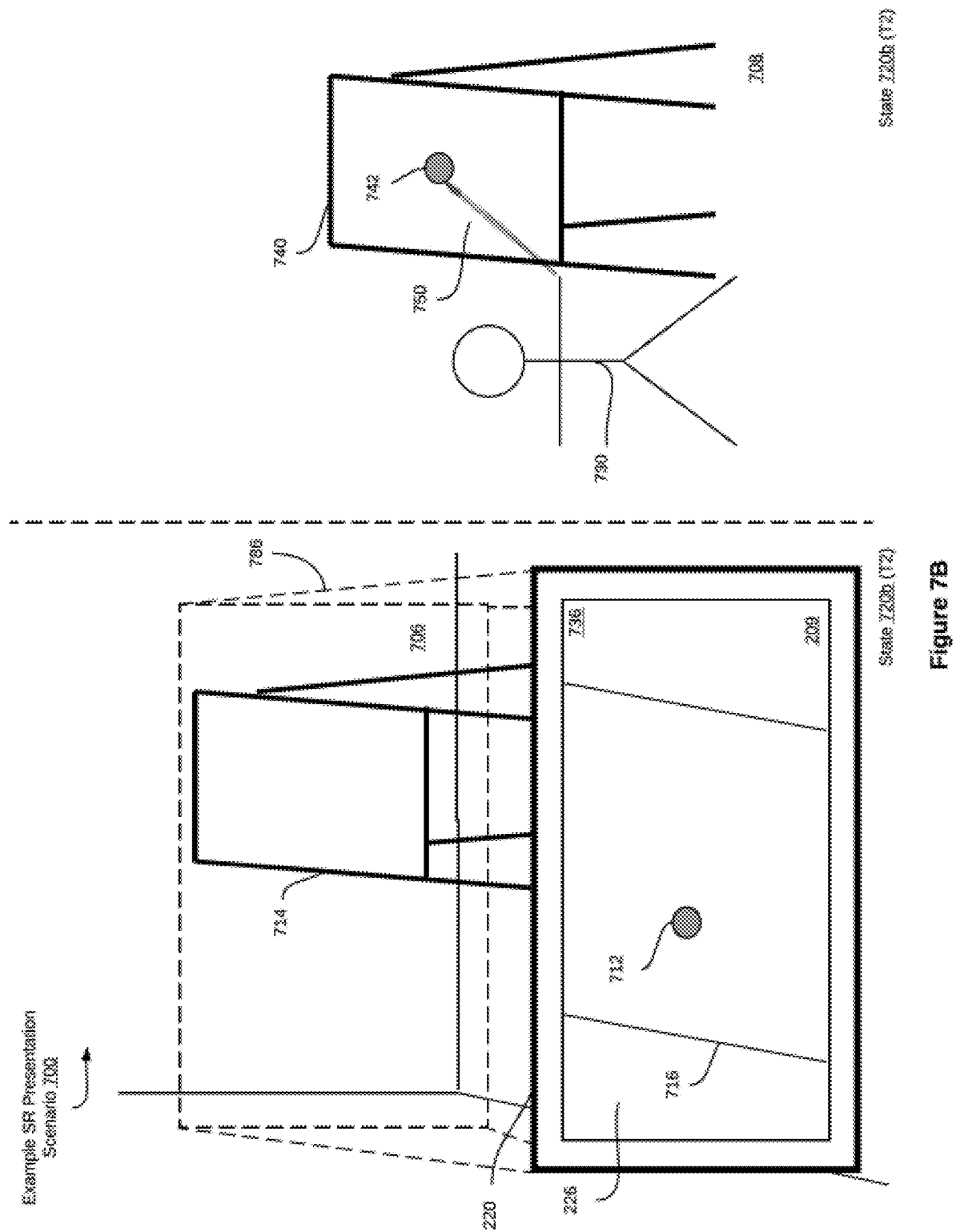

FIG. 7B illustrates a second state 720*b* (T2 or the second time period) of the example SR presentation scenario 700 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

FIG. 7B illustrates a second state 720*b* (T2 or a second time period) of the first scene 706 associated with the first user and the second state 720*b* (T2 or a second time period) of the second scene 708 associated with the second user 730. In contrast to the first state 720*a* of the second scene 708, the second state 720*b* of the second scene 708 shows the second user 730 interacting with the second paint easel 740 by using the first paintbrush 750 to paint a dot 742 on the second paint easel 740. In some embodiments, an external camera or a SR device 160 worn by the second user 730 captures the scene 708 including the first paintbrush 750 interacting with the second paint easel 740. In the second state 720*b* of the first scene 706, the user device 220 associated with the first user displays, on the display screen 226, a first SR representation 712 of the first real-world interaction associated with the second user 730 on the representation 716 of the first paint easel 714 within the representation 736 of the first scene 706 in response to the second user interacting with the second paint easel 740 with the first paintbrush 750 in the second state 720*b* of the second scene 708. For example, as shown in FIG. 7B, the first SR representation 712 corresponds to an overlay on the representation 716 of the first paint easel 714. In this example, the first paint easel 714 corresponds to a real-world item.

FIG. 7C illustrates a third state 720*c* (T3 or a third time period) of the example SR presentation scenario 700 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

FIG. 7C illustrates a third state 720*c* (T3 or the third time period) of the first scene 706 associated with the first user and the third state 720*c* of the second scene 708 associated with the second user 730. In contrast to the first state 720*a* and the second state 720*b* of the second scene 708, the third state 720*c* of the second scene 708 shows the second user 730 holding a second paintbrush 760 (e.g., a coarse/thick paintbrush) instead of the first paintbrush 750 (e.g., a fine/thin paintbrush). For example, the second paintbrush 760 produces a thicker paint stroke than the first paintbrush 750. Accordingly, when the second user 730 interacts with the second paint easel 740 using the second paintbrush 760, the user device 220 will display a different SR representation of the real-world interaction with the second paintbrush 760 as compared to the real-world interaction with the first paintbrush 750 in FIG. 7B.

FIG. 7D illustrates a fourth state 720*d* (T4 or a fourth time period) of the example SR presentation scenario 700 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

FIG. 7D illustrates a fourth state 720*d* (T4 or a fourth time period) of the first scene 706 associated with the first user and the fourth state 720*d* of the second scene 708 associated with the second user 730. In contrast to the third state 720*c* of the second scene 708, the fourth state 720*d* of the second scene 708 shows the second user 730 interacting with the second paint easel 740 by using the second paintbrush 760 to paint a long brush stroke 744 on the second paint easel 740. As shown in FIG. 7D, the second paintbrush 760 interacts with the second paint easel 740 differently than the first paintbrush 750 as shown in FIG. 7B. In some embodiments, an external camera or a SR device 160 worn by the second user 730 captures the scene 708 including the second paintbrush 760 interacting with the second paint easel 740. In the fourth state 720*d* of the first scene 706, the user device 220 generates a second SR representation 724 of the second real-world interaction associated with the second user 730 on the representation 716 of the first paint easel 714 in response to the second user 730 interacting with the second paint easel 740 with the second paintbrush 760 in the fourth state 720*d* of the second scene 708. For example, as shown in FIG. 7D, the second SR representation 724 corresponds to an overlay on the representation 716 of the first paint easel 714. As shown in FIG. 7D, the first SR representation 712 and the second SR representation 724 appear different because the first real-world interaction from the second user 730 in FIG. 7B is different from the second real-world interaction from the second user 730 in FIG. 7D.

Figure 8:
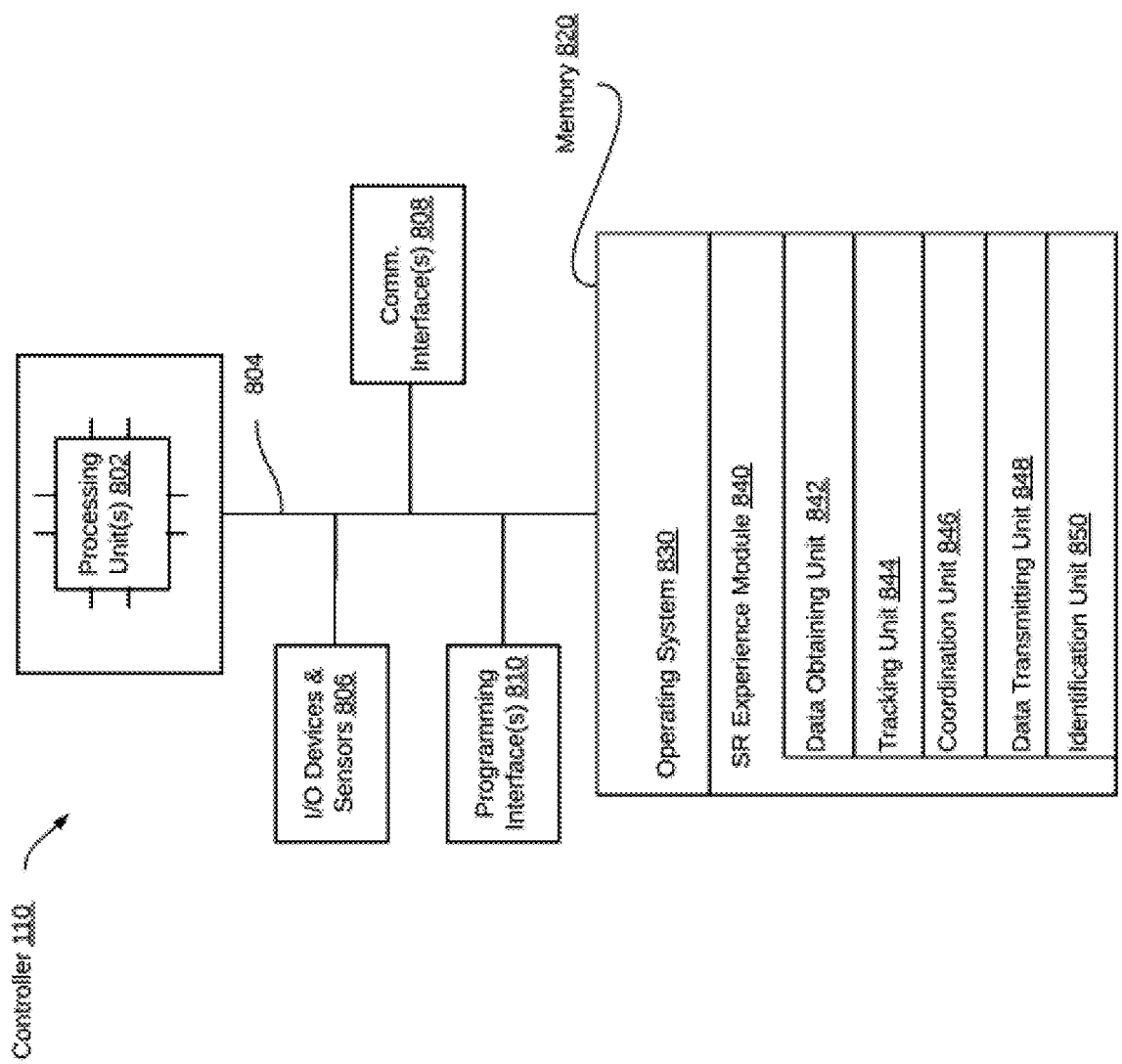
FIG. 8 is a block diagram of an example controller in accordance with some implementations.

FIG. 8 is a block diagram of an example of a controller 110 (e.g., the controller 110 shown in FIG. 1) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 802 (e.g., microprocessors, application-specific integrated-circuits (ASICs), field-programmable gate arrays (FPGAs), graphics processing unit (GPUs), central processing units (CPUs), processing cores, and/or the like), one or more input/output (I/O) devices and sensors 806, a communications interface 808 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning systems (GPS), infrared (IR), BLUETOOTH, ZIGBEE, and/or the like type interfaces), one or more programming (e.g., I/O) interfaces 810, a memory 820 and one or more communication buses 804 for interconnecting these and various other components.

In some implementations, the one or more communication buses 804 include circuitry that interconnects and controls communications between system components. In some implementations, the one or more I/O devices and sensors 806 include at least one of a keyboard, a mouse, a touchpad, a joystick, one or more microphones, one or more speakers, one or more image sensors, one or more displays, and/or the like.

The memory 820 includes high-speed random-access memory, such as DRAM, SRAM, DDR, RAM, or other random-access solid-state memory devices, and may include non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 comprises a non-transitory computer readable storage medium. In some implementations, the memory 820 or the non-transitory computer readable storage medium of the memory 820 stores the following programs, modules, and data structures, or a subset thereof including an optional operating system 830 and an SR experience module 840. In some implementations, one or more instructions are included in a combination of logic and non-transitory memory.

The operating system 830 includes procedures for handling various basic system services and for performing hardware-dependent tasks.

In some implementations, the SR experience module 840 is configured to manage and coordinate one or more SR experiences for one or more users (e.g., a single SR experience for one or more users or multiple SR experiences for respective groups of one or more users). To that end, in various implementations, the SR experience module 840 includes a data obtaining unit 842, a tracking unit 844, a coordination unit 846, a data transmitting unit 848, and an identification unit 850.

In some implementations, the data obtaining unit 842 is configured to obtain data (e.g., presentation data, interaction data, sensor data, location data, etc.) from at least one of a user device (e.g., the SR device 160 shown in FIGS. 1 and 4, the user device 220 shown in FIGS. 2A-2F, 6A, 6B, and 7A-7D, the device 901 shown in FIG. 9, or the like) and a display device (e.g., the display device 130 shown in FIGS. 1, 2A-2F, and 10). To that end, in various implementations, the data obtaining unit 842 includes instructions and/or logic therefor, and heuristics and metadata therefor.

In some implementations, the tracking unit 844 is configured to map the scene 105 and to track the position/location of at least one the user device (e.g., the SR device 160 shown in FIGS. 1 and 4, the user device 220 shown in FIGS. 2A-2F, 6A, 6B, and 7A-7D, the device 901 shown in FIG. 9, or the like) with respect to a scene or operating environment (e.g., the scene 105 shown in FIG. 1, or the scene 405 shown in FIG. 4). To that end, in various implementations, the tracking unit 844 includes instructions and/or logic therefor, and heuristics and metadata therefor.

Figure 9:
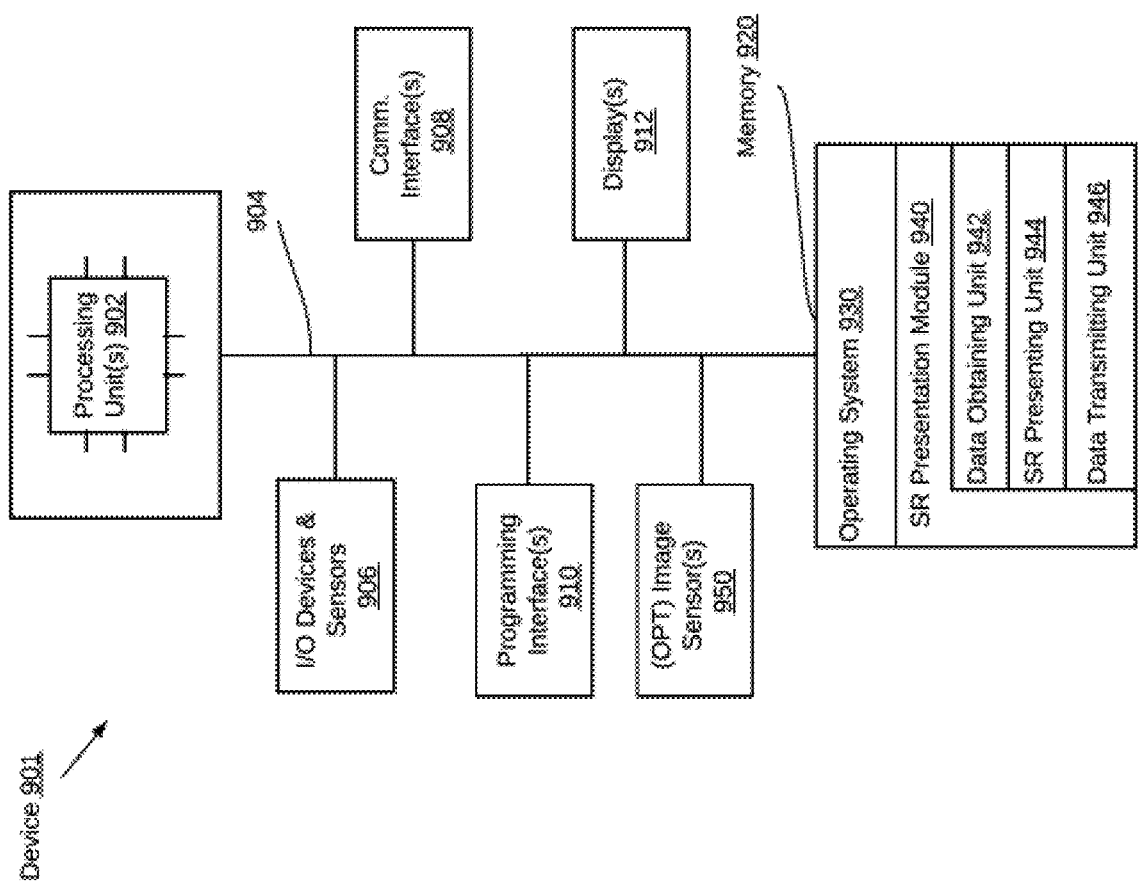
FIG. 9 is a block diagram of an example device in accordance with some implementations.

In some implementations, the coordination unit 846 is configured to manage and coordinate the SR experience presented to a user by the user device (e.g., the SR device 160 shown in FIGS. 1 and 4, the user device 220 shown in FIGS. 2A-2F, 6A, 6B, and 7A-7D, the device 901 shown in FIG. 9, or the like). To that end, in various implementations, the coordination unit 846 includes instructions and/or logic therefor, and heuristics and metadata therefor.

In some implementations, the data transmitting unit 848 is configured to transmit data (e.g., presentation data, location data, etc.) to at least one of the user device (e.g., the SR device 160 shown in FIGS. 1 and 4, the user device 220 shown in FIGS. 2A-2F, 6A, 6B, and 7A-7D, the device 901 shown in FIG. 9, or the like) and the display device (e.g., the display device 130 shown in FIGS. 1, 2A-2F, and 10). To that end, in various implementations, the data transmitting unit 848 includes instructions and/or logic therefor, and heuristics and metadata therefor.

In some implementations, the identification unit 850 is configured to identify at least one item in a video feed or image frame according to instance segmentation, semantic segmentation, and/or other computer vision techniques. To that end, in various implementations, the identification unit 850 includes instructions and/or logic therefor, and heuristics and metadata therefor.

Although the data obtaining unit 842, the tracking unit 844, the coordination unit 846, the data transmitting unit 848, and the identification unit 850 are shown as residing on a single device (e.g., the controller 110), it should be understood that in other implementations, any combination of the data obtaining unit 842, the tracking unit 844, the coordination unit 846, the data transmitting unit 848, and the identification unit 850 may be located in separate computing devices.

Moreover, FIG. 8 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 9 is a block diagram of an example of a device 901 (e.g., the SR device 160 shown in FIGS. 1 and 4, or the user device 220 shown in FIGS. 2A-2F, 6A, 6B, and 7A-7D) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 901 includes one or more processing units 902 (e.g., microprocessors, ASICs, FPGAs, GPUs, CPUs, processing cores, and/or the like), one or more I/O devices and sensors 906, one or more communications interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interfaces), one or more programming (e.g., I/O) interfaces 910, one or more displays 912, a memory 920, one or more optional exterior- and/or interior-facing image sensors 950, and one or more communication buses 904 for interconnecting these and various other components.

In some implementations, the one or more communication buses 904 include circuitry that interconnects and controls communications between system components.

In some implementations, the one or more displays 912 are capable of presenting an SR experience or SR content (e.g., to the user 170 shown in FIG. 1, or the first user 410 shown in FIG. 4). In some implementations, the one or more displays 912 are also configured to present flat video content to the user (e.g., a 2-dimensional or "flat" audio video interleave (AVI), flash video (FLV), Windows Media Video (WMV), or the like file associated with a TV episode or a movie, or live video pass-through of the example SR presentation scenario 200 in FIGS. 2A-2F, or the like). In some implementations, the one or more displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro mechanical systems (MEMS), and/or the like display types. In some implementations, the one or more displays 912 correspond to diffractive, reflective, polarized, holographic, etc. waveguide displays. For example, the device 901 includes a single display similar to the user device 220 in FIGS. 2A-2F, 6A, 6B, and 7A-7D. In another example, the device 901 includes a display for each eye of the user similar to the SR device 160 in FIGS. 1 and 4.

In some implementations, the one or more optional exterior- and/or interior-facing image sensors 950 are configured to obtain image data frames. For example, the one or more optional exterior- and/or interior-facing image sensors 950 correspond to one or more RGB cameras (e.g., with a complementary metal-oxide-semiconductor (CMOS) image sensor, or a charge-coupled device (CCD) image sensor), infrared (IR) image sensors, event-based cameras, and/or the like.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 comprises a non-transitory computer readable storage medium. In some implementations, the memory 920 or the non-transitory computer readable storage medium of the memory 920 stores the following programs, modules and data structures, or a subset thereof including an optional operating system 930 and an SR presentation module 940.

The operating system 930 includes procedures for handling various basic system services and for performing hardware dependent tasks.

In some implementations, the SR presentation module 940 is configured to present SR content to the user via the one or more displays 912. To that end, in various implementations, the SR presentation module 940 includes a data obtaining unit 942, an SR presenting unit 944, and a data transmitting unit 946.

In some implementations, the data obtaining unit 942 is configured to obtain data (e.g., presentation data, interaction data, location data, etc.) from at least one of the sensors associated with the device 901, a controller (e.g., the controller 110 shown in FIGS. 1 and 8) and a display device (e.g., the display device 130 shown in FIGS. 1, 2A-2F, and 10). To that end, in various implementations, the data obtaining unit 942 includes instructions and/or logic therefor, and heuristics and metadata therefor.

In some implementations, the SR presenting unit 944 is configured to present SR content via the one or more displays 912. To that end, in various implementations, the SR presenting unit 944 includes instructions and/or logic therefor, and heuristics and metadata therefor.

In some implementations, the data transmitting unit 946 is configured to transmit data (e.g., presentation data, location data, etc.) to at least one of the controller (e.g., the controller 110 shown in FIGS. 1 and 8) and the display device (e.g., the display device 130 shown in FIGS. 1, 2A-2F, and 10). To that end, in various implementations, the data transmitting unit 946 includes instructions and/or logic therefor, and heuristics and metadata therefor.

In some implementations, the device 901 optionally includes an identification is configured to identify at least one item in a video feed or image frame according to instance segmentation, semantic segmentation, and/or other computer vision techniques. To that end, in various implementations, the identification unit includes instructions and/or logic therefor, and heuristics and metadata therefor.

Although the data obtaining unit 942, the SR presenting unit 944, and the data transmitting unit 946 are shown as residing on a single device (e.g., the device 901), it should be understood that in some implementations, any combination of the data obtaining unit 942, the SR presenting unit 944, and the data transmitting unit 946 may be located in separate computing devices.

Moreover, FIG. 9 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 10 is a block diagram of an example of the display device 130 (e.g., a television (TV) or other display as shown in FIGS. 1 and 2A-2F) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the display device 130 includes one or more processing units 1002 (e.g., microprocessors, ASICs, FPGAs, GPUs, CPUs, processing cores, and/or the like), one or more input/output (I/O) devices and sensors 1006, one or more communication interfaces 1008 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1010, one or more displays 1012, a memory 1020, and one or more communication buses 1004 for interconnecting these and various other components. In some implementations, the display device 130 is optionally controlled by a remote-control device, voice commands, a controller (e.g., the controller 110 shown in FIGS. 1 and 8), a user device (e.g., the SR device 160 shown in FIGS. 1 and 4, or the user device 220 shown in FIGS. 2A-2F, 6A, 6B, and 7A-7D), or the like.

In some implementations, the one or more communication buses 1004 include circuitry that interconnects and controls communications between system components. In some implementations, the one or more I/O devices and sensors 1006 include at least one of one or more IR sensors, one or more physical buttons, one or more microphones, one or more speakers, one or more image sensors, one or more depth sensors, and/or the like.

In some implementations, the one or more displays 1012 correspond to holographic, DLP, LCD, LCoS, OLET, OLED, SED, FED, QD-LED, MEMS, and/or the like display types.

The memory 1020 includes high-speed random-access memory, such as DRAM, SRAM, DDR, RAM, or other random-access solid-state memory devices, and may include non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium. In some implementations, the memory 1020 or the non-transitory computer readable storage medium of the memory 1020 stores the following programs, modules, and data structures, or a subset thereof including an optional operating system 1030 and an SR presentation module 1040. In some implementations, one or more instructions are included in a combination of logic and non-transitory memory.

The operating system 1030 includes procedures for handling various basic system services and for performing hardware dependent tasks. In some implementations, the SR presentation module 1040 is configured to present media content (e.g., video and/or audio content) to users via the one or more displays 1012 and the one or more I/O devices and sensors 1006 (e.g., one or more speakers). To that end, in various implementations, the SR presentation module 1040 includes a data obtaining unit 1042, a presenting unit 1044, and a data transmitting unit 1046.

In some implementations, the data obtaining unit 1042 is configured to obtain data (e.g., presentation data, user interaction data, etc.) from at least one of sensors in the scene 105, sensors associated with the display device 130, the controller (e.g., the controller 110 in FIGS. 1 and 8), the user device (e.g., the SR device 160 shown in FIGS. 1 and 4, or the user device 220 shown in FIGS. 2A-2F, 6A, 6B, and 7A-7D). To that end, in various implementations, the data obtaining unit 1042 includes instructions and/or logic therefor, and heuristics and metadata therefor.

In some implementations, the presenting unit 1044 is configured to render and display video content via the one or more displays 1012. To that end, in various implementations, the presenting unit 1044 includes instructions and/or logic therefor, and heuristics and metadata therefor.

In some implementations, the data transmitting unit 1046 is configured to transmit data (e.g., presentation data, user interaction data, etc.) to at least one of the controller (e.g., the controller 110 shown in FIGS. 1 and 8) and the user device (e.g., the SR device 160 shown in FIGS. 1 and 4, or the user device 220 shown in FIGS. 2A-2F, 6A, 6B, and 7A-7D). To that end, in various implementations, the data transmitting unit 1046 includes instructions and/or logic therefor, and heuristics and metadata therefor.

Although the data obtaining unit 1042, the presenting unit 1044, and the data transmitting unit 1046 are shown as residing on a single device (e.g., the display device 130), it should be understood that in other implementations, any combination of the data obtaining unit 1042, the presenting unit 1044, and the data transmitting unit 1046 may be located in separate computing devices.

Moreover, FIG. 10 is intended more as a functional description of the various features that could be present in a particular embodiment as opposed to a structural schematic of the implementations described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first user could be termed a second user, and, similarly, a second user could be termed a first user, which changing the meaning of the description, so long as the occurrences of the "first user" are renamed consistently and the occurrences of the "second user" are renamed consistently. The first user and the second user are both users, but they are not the same user.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including one or more processors, non-transitory memory, and one or more displays:
capturing an image stream associated with a physical environment that corresponds to a field-of-view of an image sensor of the device, wherein the physical environment at least includes an item and the image stream shows the item from a first perspective;
identifying the item within the image stream;
generating an affordance-item pair that corresponds to the item, wherein the affordance-item pair corresponds to visual feedback indicating that the item is selectable;
displaying, on the one or more displays, the image stream of the physical environment and the affordance-item pair in association with the item;
detecting an input selecting the affordance-item pair; and
in response to detecting the input selecting the affordance-item pair:
ceasing to display the affordance-item pair in association with the item; and
concurrently displaying:
the image stream showing the item from the first perspective; and
a three-dimensional (3D) model of the item that is manipulatable to show the 3D model of the item from a second perspective that is different from the first perspective.

2. The method of claim 1, further comprising:
obtaining an item manifest corresponding to the item in the image stream, wherein the item manifest includes a plurality of items associated with the item.

3. The method of claim 1, further comprising:
displaying, on the one or more displays, an affordance associated with the affordance-item pair by compositing the affordance with at least a portion of the item in the image stream.

4. The method of claim 1, wherein identifying the item in the image stream includes performing at least one of instance segmentation or semantic segmentation on the image stream in order to identify the item in the image stream.

5. The method of claim 1, wherein the 3D model of the item is overlaid on the image stream showing the item.

6. The method of claim 1, further comprising:
determining whether the input corresponds to a first selection input type or a second selection input type, wherein the first selection input type causes a transition from displaying the image stream on the device to concurrently displaying the image stream showing the item and the 3D model of the item on the one or more displays, and wherein the second selection input type causes a download of the 3D model of the item.

7. The method of claim 1, wherein the 3D model of the item is displayed within a simulated reality (SR) environment, and the method further comprising:
generating additional SR content in the SR environment, wherein the additional SR content corresponds to an additional item that is related to the item.

8. The method of claim 1, wherein the 3D model of the item is subject to digital rights management (DRM) protection in order to restrict manipulation of the 3D model of the item.

9. The method of claim 1, wherein the affordance-item pair corresponds to a first affordance-item pair, and wherein the item corresponds to a first item within the image stream, and the method further comprising:
prior to detecting the input selecting the first affordance-item pair:
identifying a second item within the image stream;
generating a second affordance-item pair that corresponds to the second item; and
displaying the second affordance-item pair that corresponds to the second item with the image stream of the physical environment and the first affordance-item pair that corresponds to the first item;
in response to detecting the input, determining whether input is directed to the first-affordance item pair or the second affordance-item pair;
in accordance with a determination that the input is directed to the first affordance-item pair:
ceasing to display the first and second affordance-item pairs; and
concurrently displaying:
the image stream showing the item from the first perspective and the second item from a third perspective; and
the 3D model of the item that is manipulatable to show the 3D model of the item from the second perspective that is different from the first perspective; and
in accordance with a determination that the input is directed to the second affordance-item pair:
ceasing to display the first and second affordance-item pairs; and concurrently displaying:
 the image stream showing the item from the first perspective and the second item from the third perspective; and
 a 3D model of the second item that is manipulatable to show the 3D model of the second item from a fourth perspective that is different from the third perspective.

10. The method of claim 1, further comprising:
 obtaining the 3D model of the item.

11. The method of claim 1, wherein the 3D model of the item is provided by an entity associated with the item.

12. The method of claim 1, wherein the 3D model of the item is manipulated to show the 3D model from different perspectives in response to one or more subsequent inputs.

13. The method of claim 1, wherein identifying the item includes determining whether a 3D model of the item is available for display to a user of the device.

14. The method of claim 1, further comprising:
 after displaying the 3D model of the item, detecting one or more user interactions inputs directed to the 3D model of the item; and
 in response to detecting the one or more user interactions inputs, modifying the 3D model of the item based at least in part on the one or more user interactions inputs.

15. The method of claim 14, wherein modifying the 3D model of the item corresponds to one of rotating the 3D model of the item, translating the 3D model of the item, or changing a zoom level of the 3D model of the item.

16. The method of claim 14, wherein modifying the 3D model of the item corresponds to one of adding SR content to the 3D model of the item, removing SR content from the 3D model of the item, changing a size of the 3D model of the item, or changing a color of the 3D model of the item.

17. The method of claim 1, wherein the 3D model of the item is manipulatable in six degrees of freedom.

18. The method of claim 1, wherein the first perspective corresponds to a first viewing angle and the second perspective corresponds to a second viewing angle that is different from the first viewing angle.

19. The method of claim 1, wherein the image stream shows the item at a first zoom level and the 3D model of the item is manipulatable to show the 3D model of the item at a second zoom level that is different from the first zoom level.

20. The method of claim 1, wherein the image stream is displayed on the one or more displays and the 3D model is displayed on a display of another device.

21. A non-transitory memory storing one or more programs, which, when executed by one or more processors of a device with one or more displays, cause the device to:
 capture an image stream associated with a physical environment that corresponds to a field-of-view of an image sensor of the device, wherein the physical environment at least includes an item and the image stream shows the item from a first perspective;
 identify the item within the image stream;
 generate an affordance-item pair that corresponds to the item, wherein the affordance-item pair corresponds to visual feedback indicating that the item is selectable;
 display, on the one or more displays, the image stream of the physical environment and the affordance-item pair in association with the item;
 detect an input selecting the affordance-item pair; and
 in response to detecting the input selecting the affordance-item pair:
  cease to display the affordance-item pair in association with the item; and
  concurrently display:
   the image stream showing the item from the first perspective; and
   a three-dimensional (3D) model of the item that is manipulatable to show the 3D model of the item from a second perspective that is different from the first perspective.

22. The non-transitory memory of claim 21, wherein the one or more programs further cause the device to:
 obtaining an item manifest corresponding to the item in the image stream, wherein the item manifest includes a plurality of items associated with the item.

23. The non-transitory memory of claim 21, wherein the one or more programs further cause the device to:
 after displaying the 3D model of the item, detect one or more user interactions inputs directed to the 3D model of the item; and
 in response to detecting the one or more user interactions inputs, modify the 3D model of the item based at least in part on the one or more user interactions inputs.

24. A device comprising:
 one or more processors;
 a non-transitory memory;
 one or more displays; and
 one or more programs stored in the non-transitory memory, which, when executed by the one or more processors, cause the device to:
  capture an image stream associated with a physical environment that corresponds to a field-of-view of an image sensor of the device, wherein the physical environment at least includes an item and the image stream shows the item from a first perspective;
  identify the item within the image stream;
  generate an affordance-item pair that corresponds to the item, wherein the affordance-item pair corresponds to visual feedback indicating that the item is selectable;
  display, on the one or more displays, the image stream of the physical environment and the affordance-item pair in association with the item;
  detect an input selecting the affordance-item pair; and
  in response to detecting the input selecting the affordance-item pair:
   cease to display the affordance-item pair in association with the item; and
   concurrently display:
    the image stream showing the item from the first perspective; and
    a three-dimensional (3D) model of the item that is manipulatable to show the 3D model of the item from a second perspective that is different from the first perspective.

25. The device of claim 24, wherein the one or more programs further cause the device to:
 obtaining an item manifest corresponding to the item in the image stream, wherein the item manifest includes a plurality of items associated with the item.

26. The device of claim 24, wherein the one or more programs further cause the device to:
 after displaying the 3D model of the item, detect one or more user interactions inputs directed to the 3D model of the item; and in response to detecting the one or more user interactions inputs, modify the 3D model of the item based at least in part on the one or more user interactions inputs.

* * * * *